May 24, 1966  E. A. VERRINDER  3,252,594
ARTICLE HANDLING APPARATUS
Filed Dec. 26, 1962  25 Sheets-Sheet 15
FIG_25
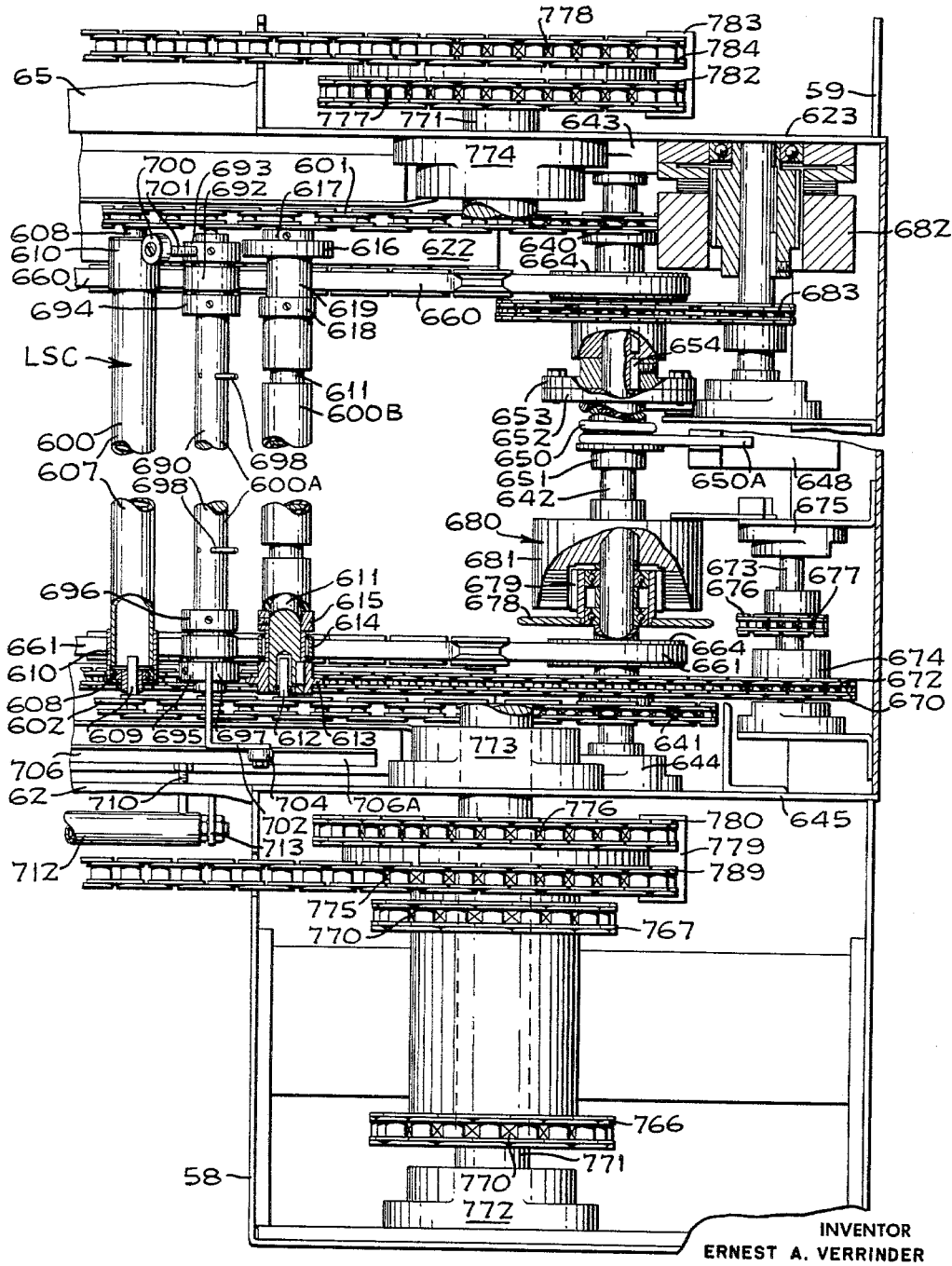
INVENTOR
ERNEST A. VERRINDER
BY Hans G. Hoffmeister
ATTORNEY

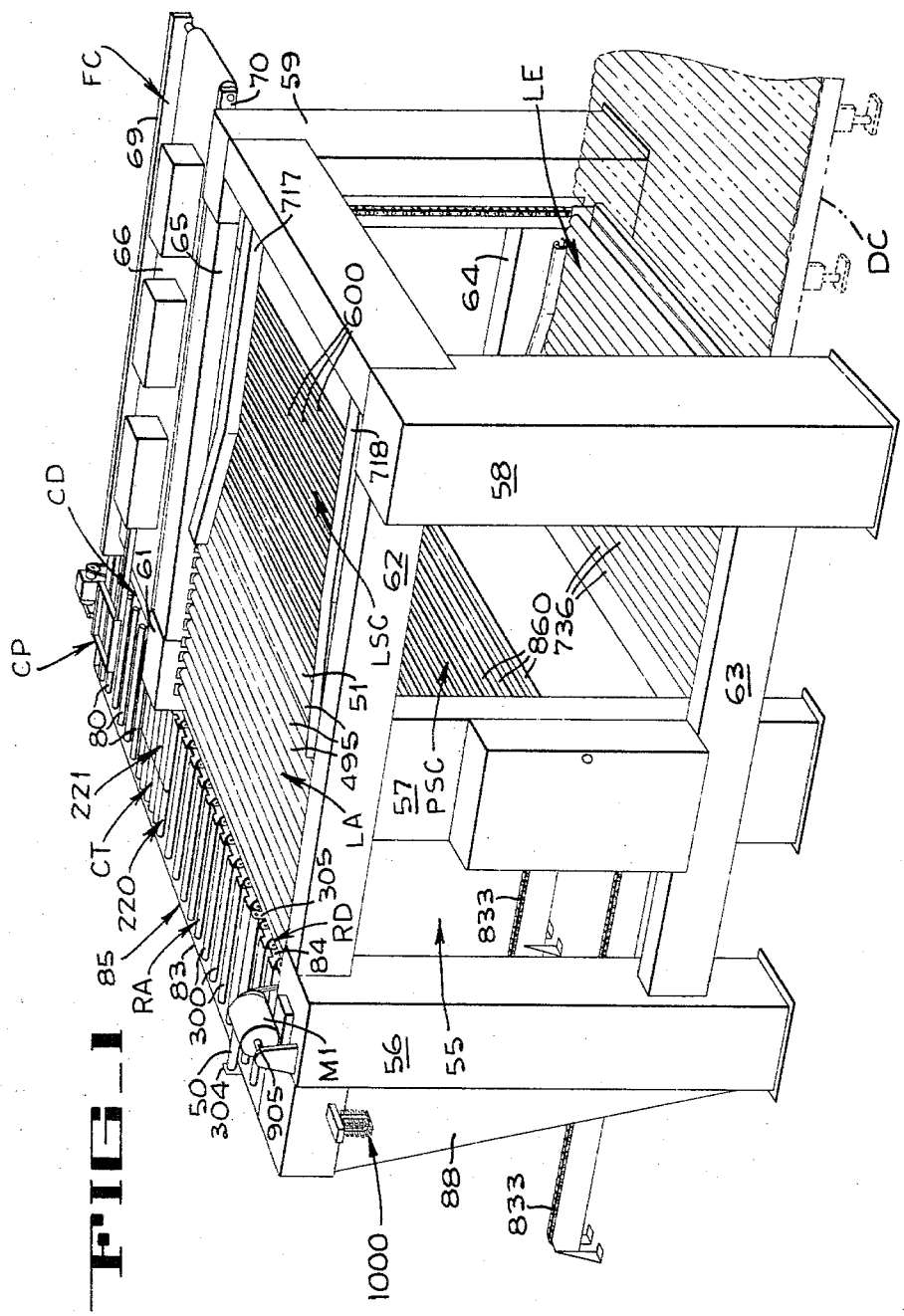

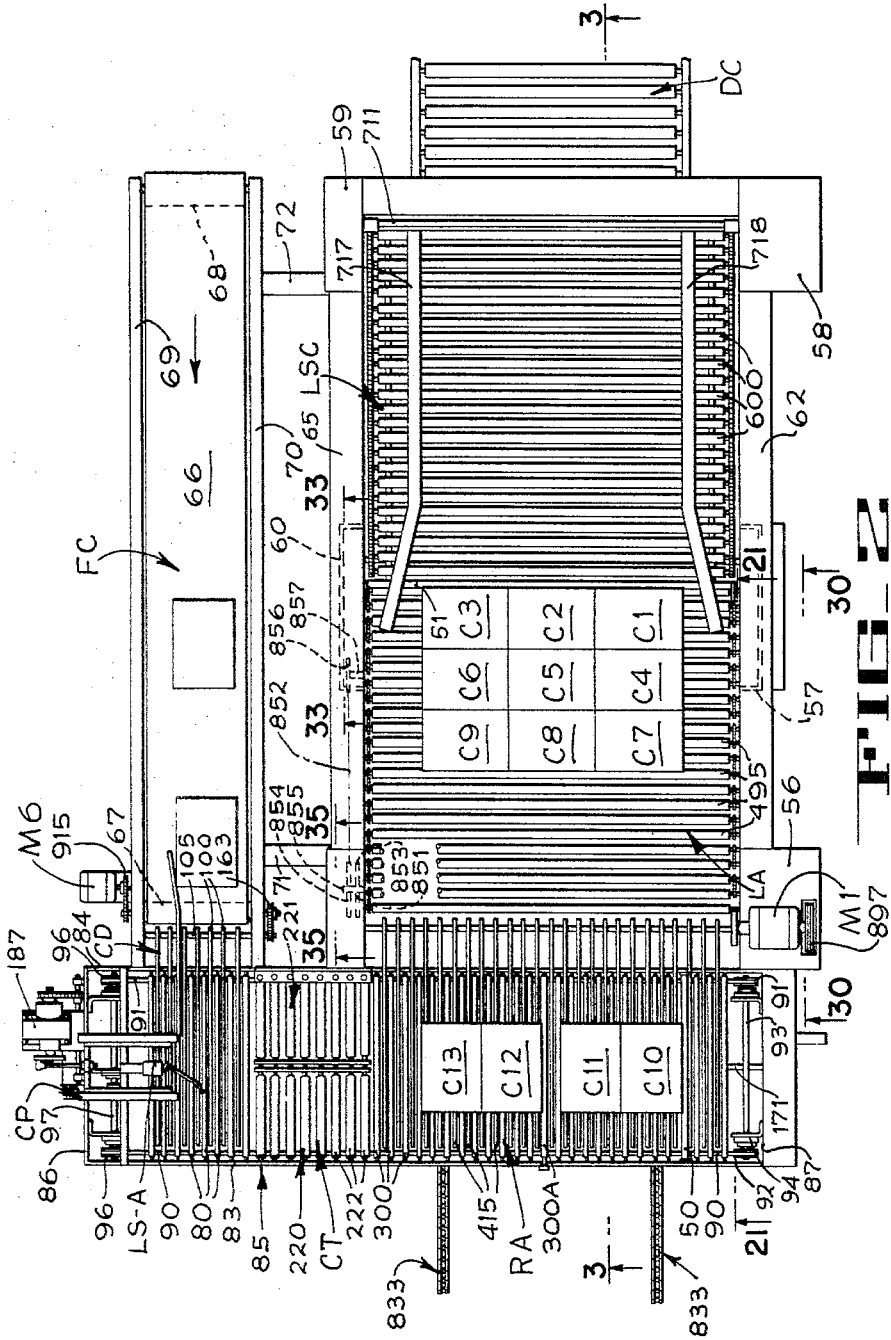

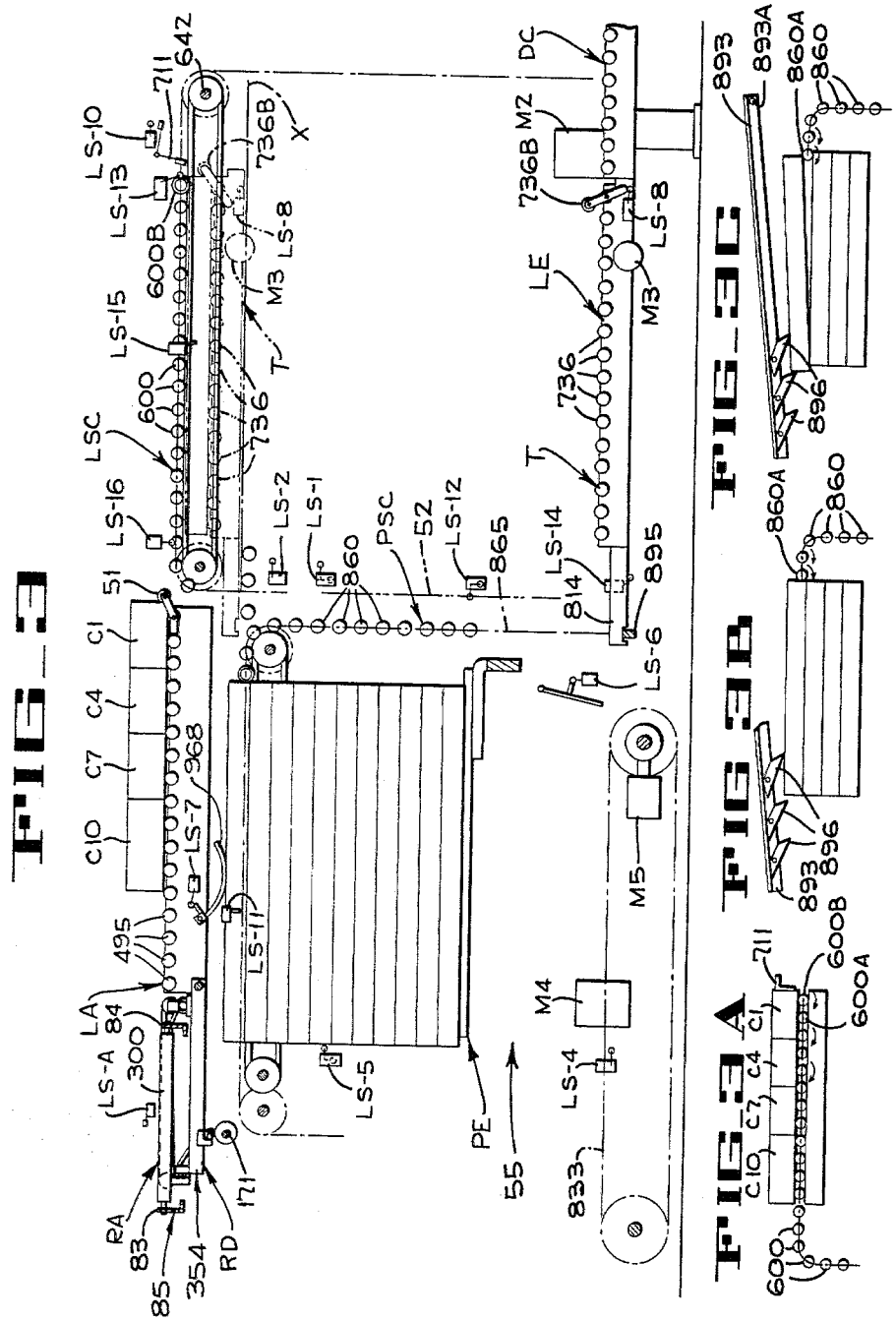

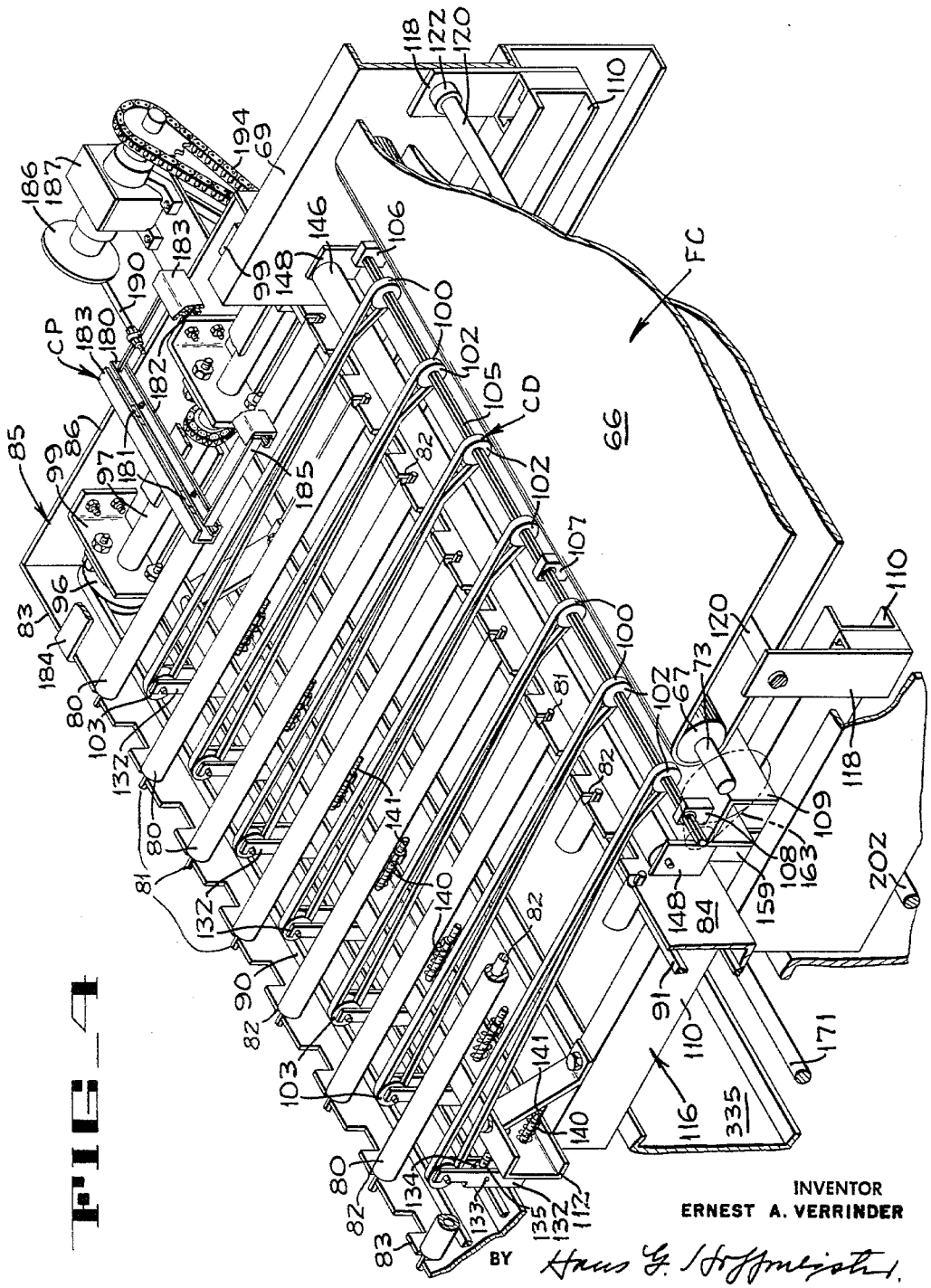

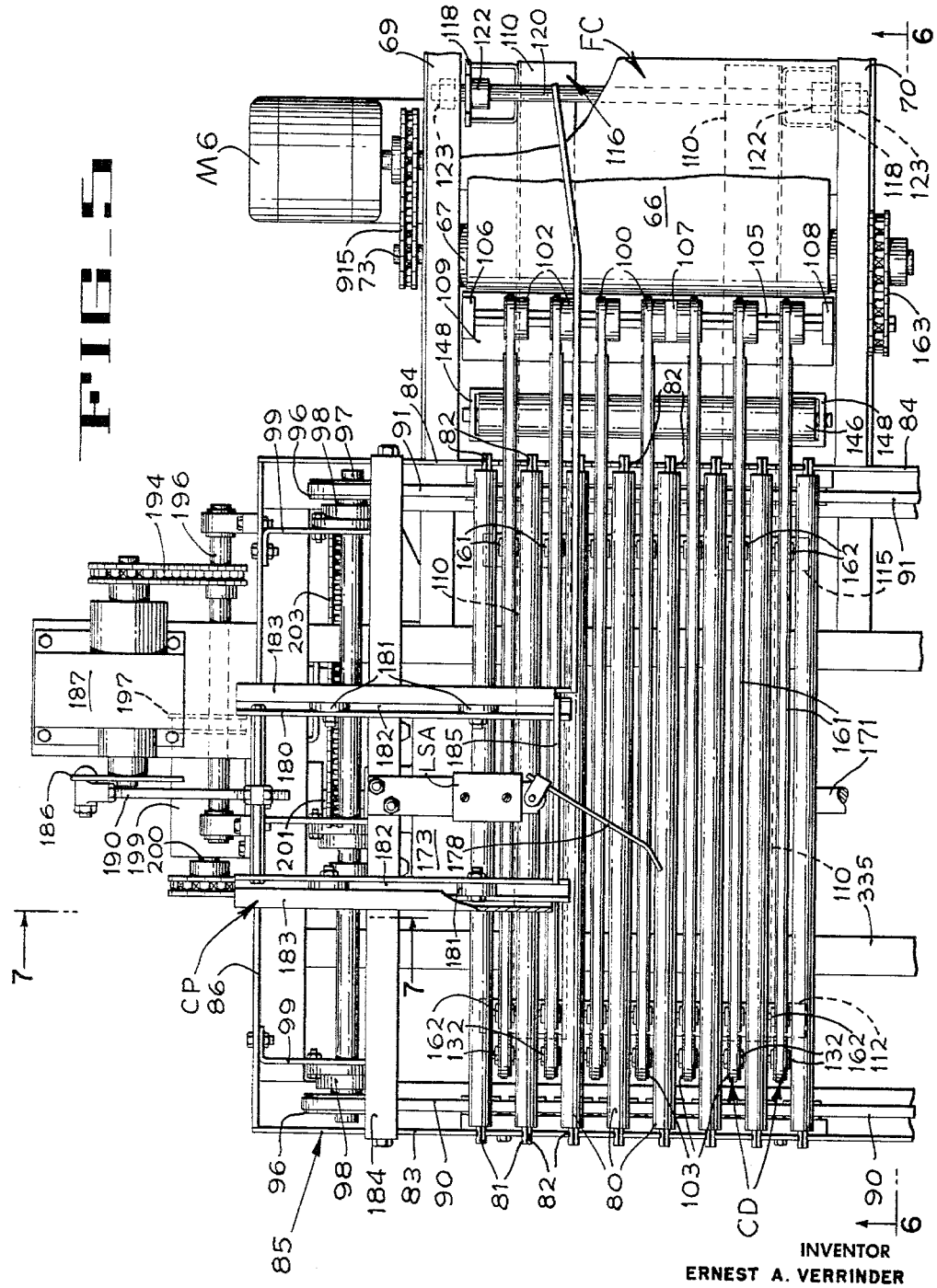

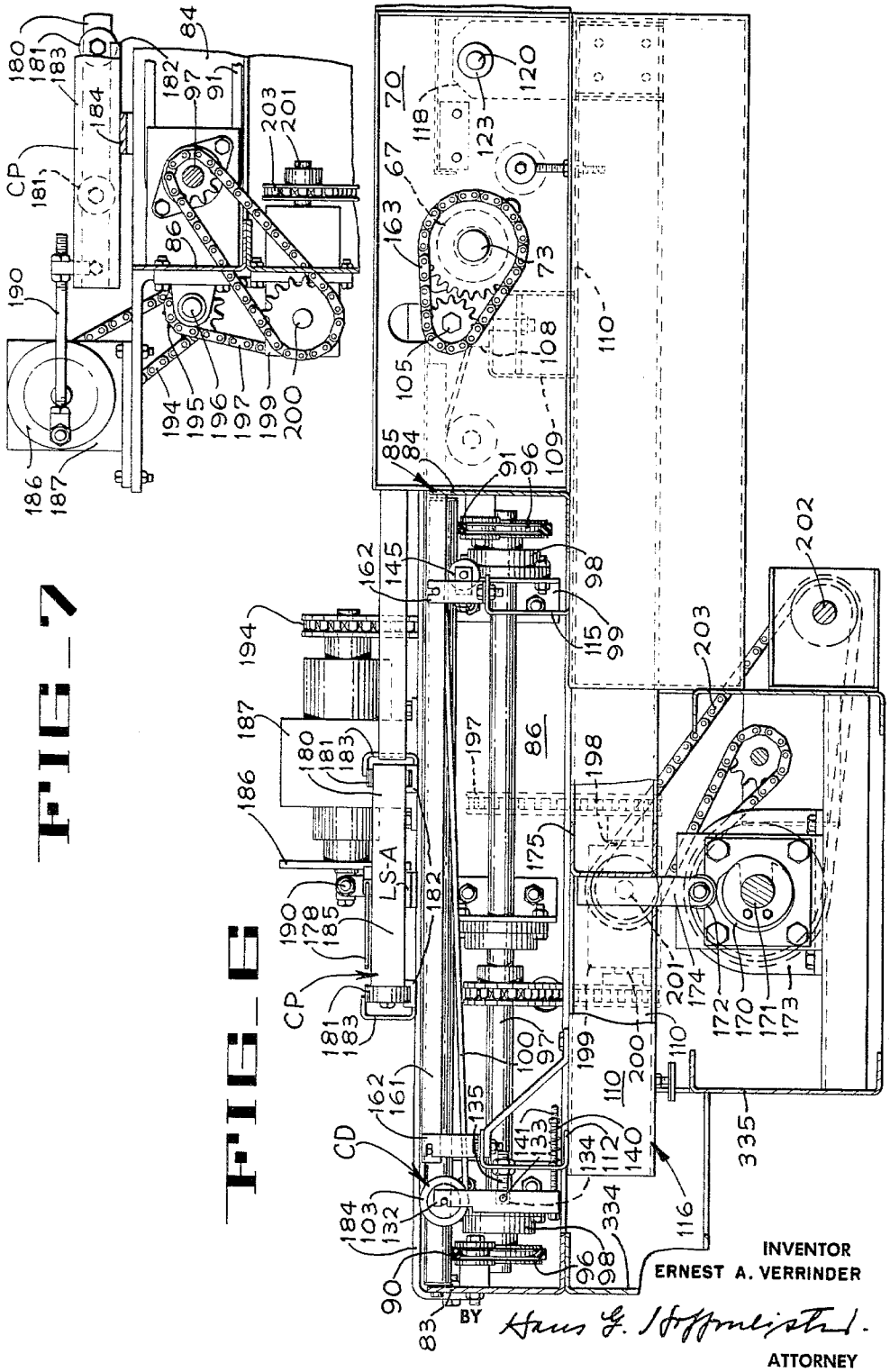

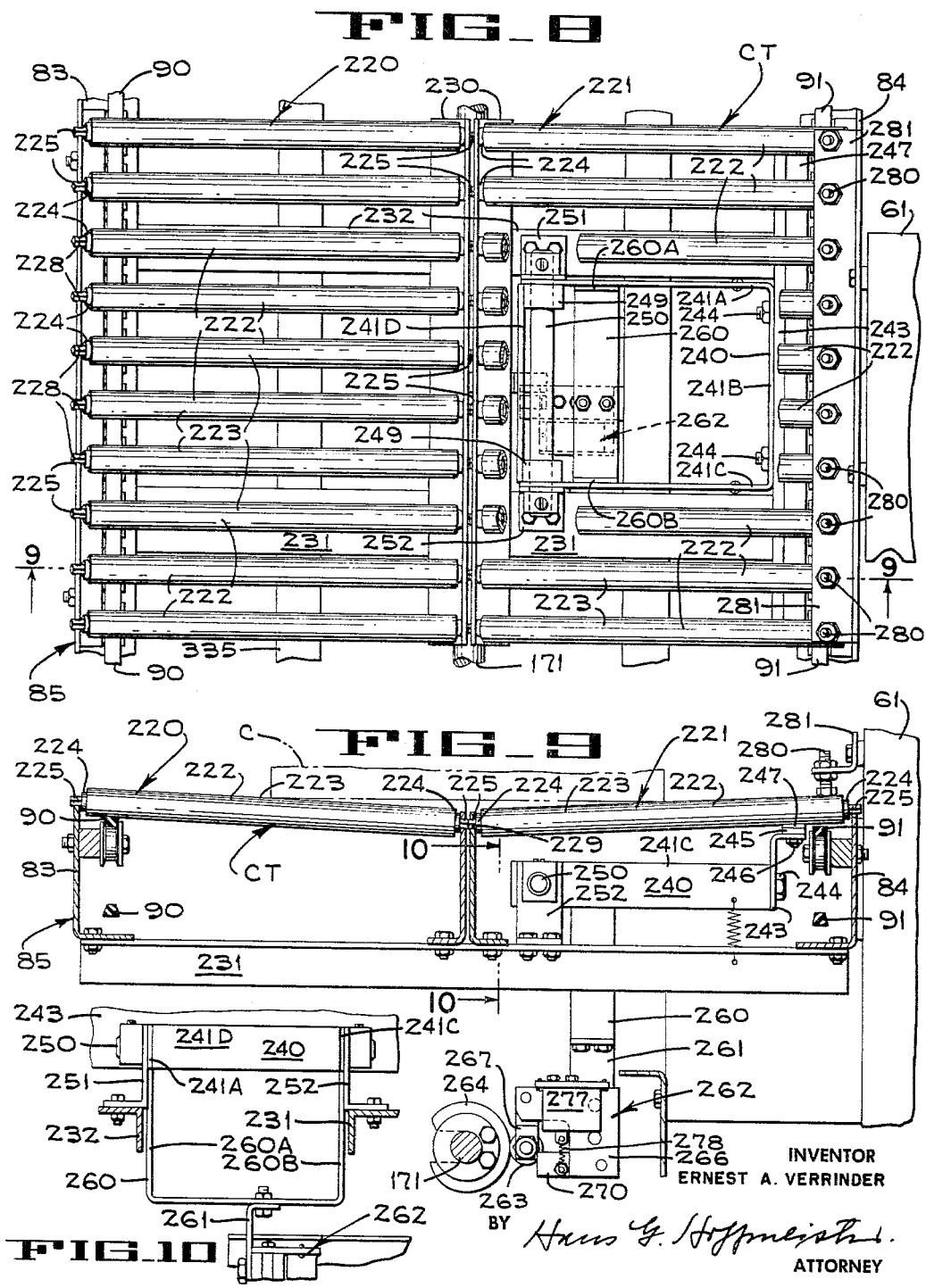

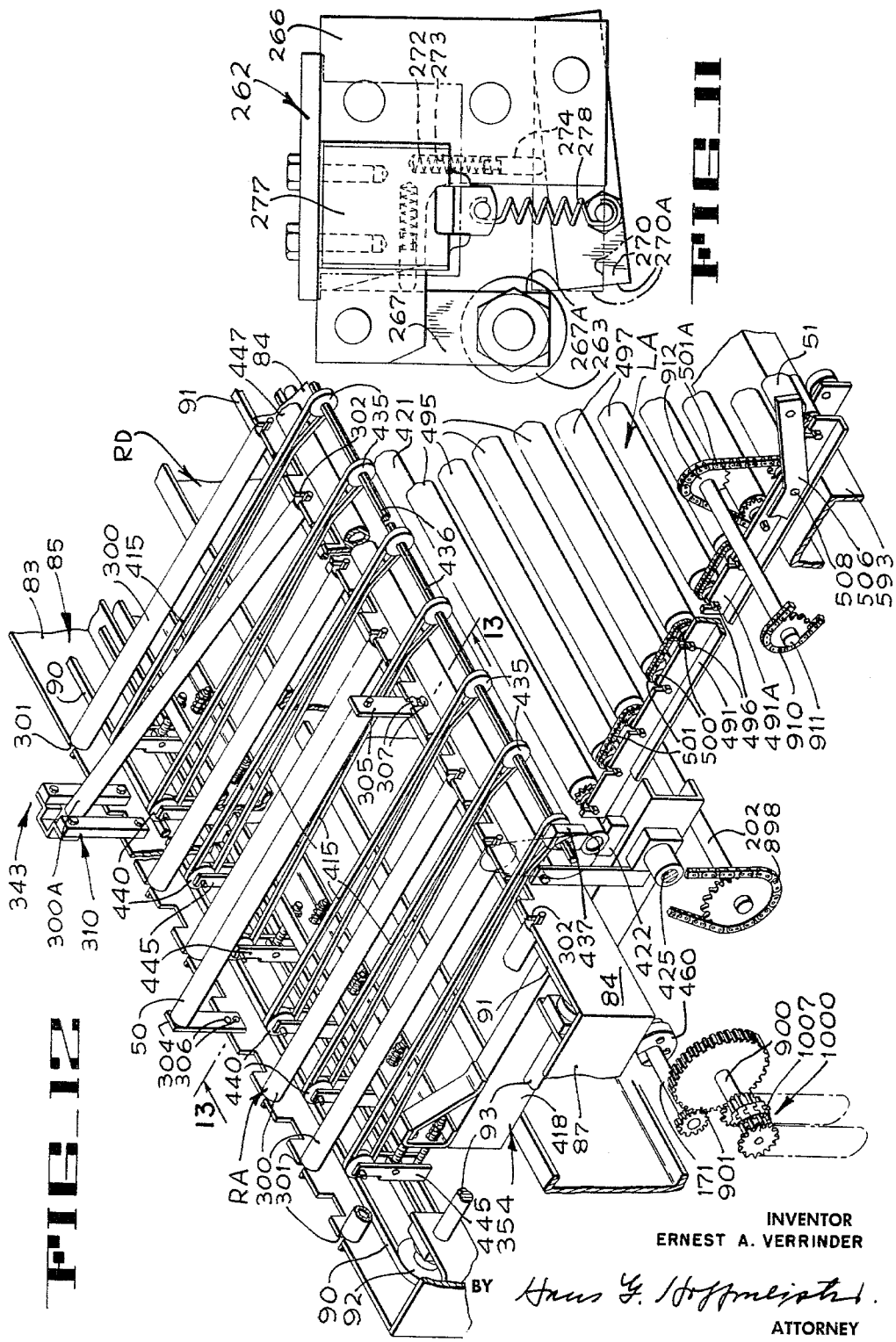

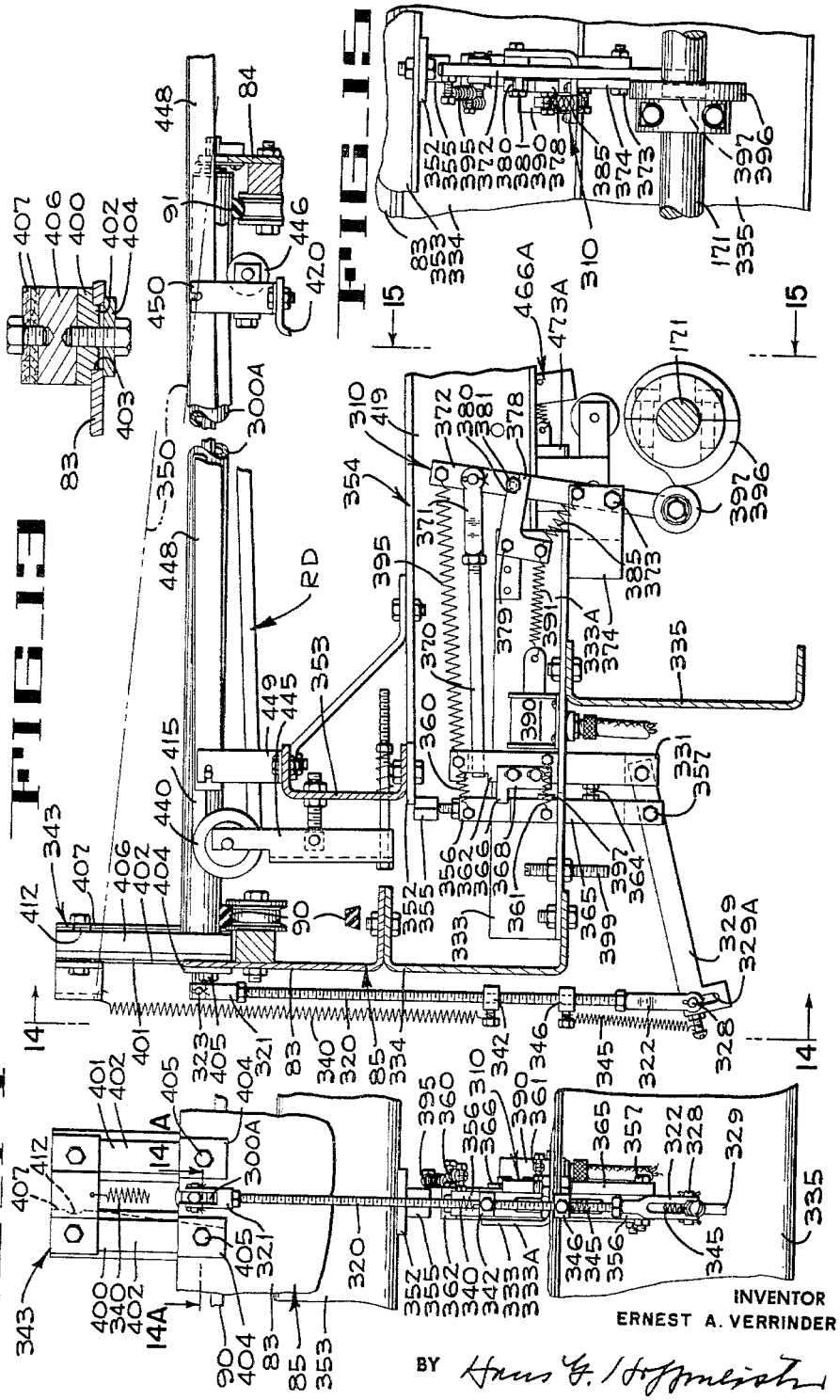

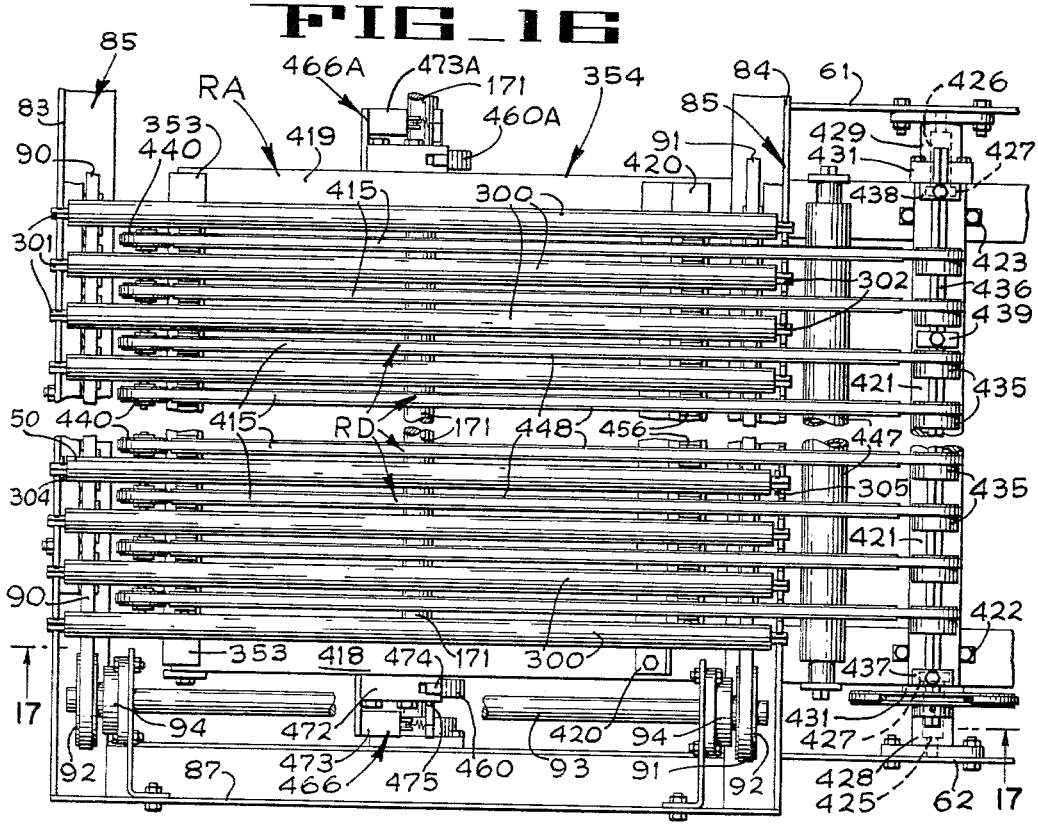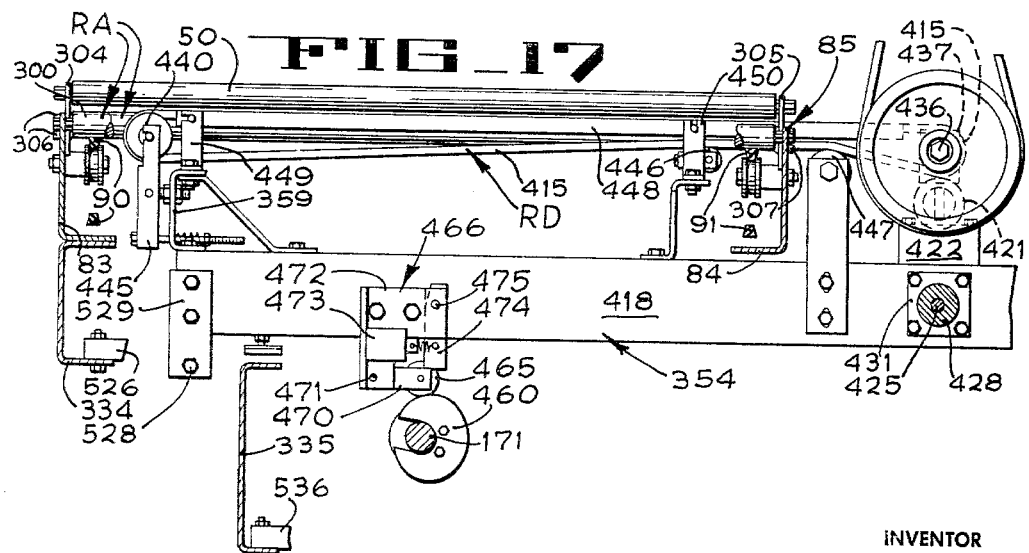

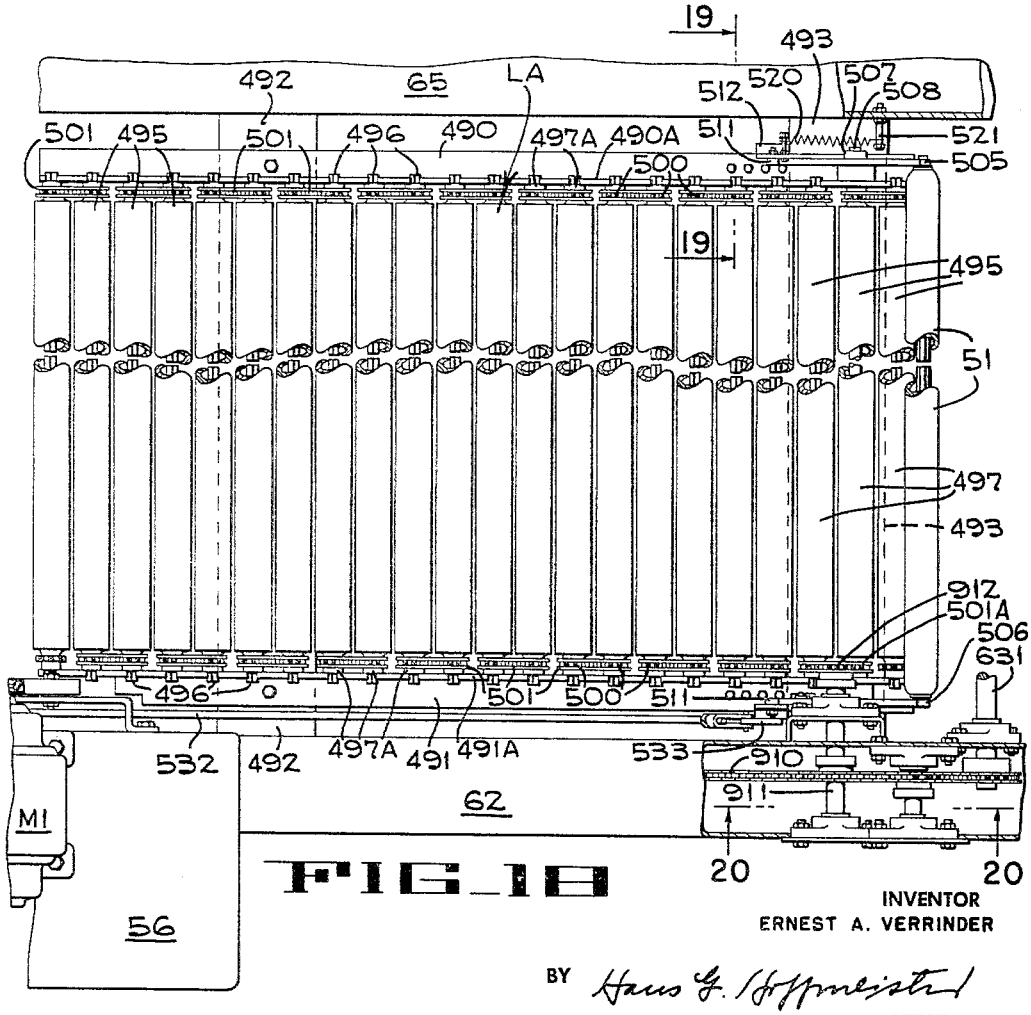

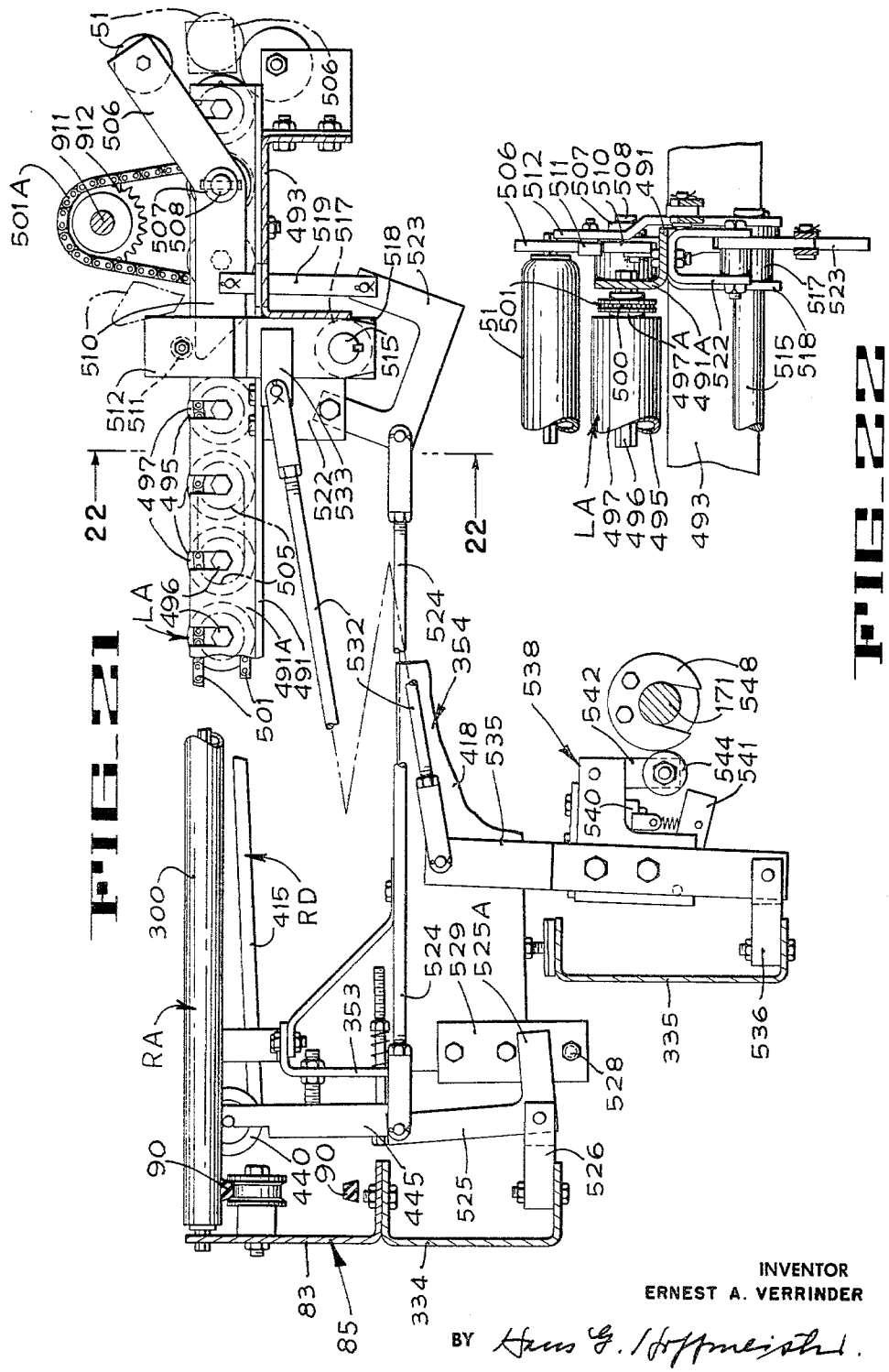

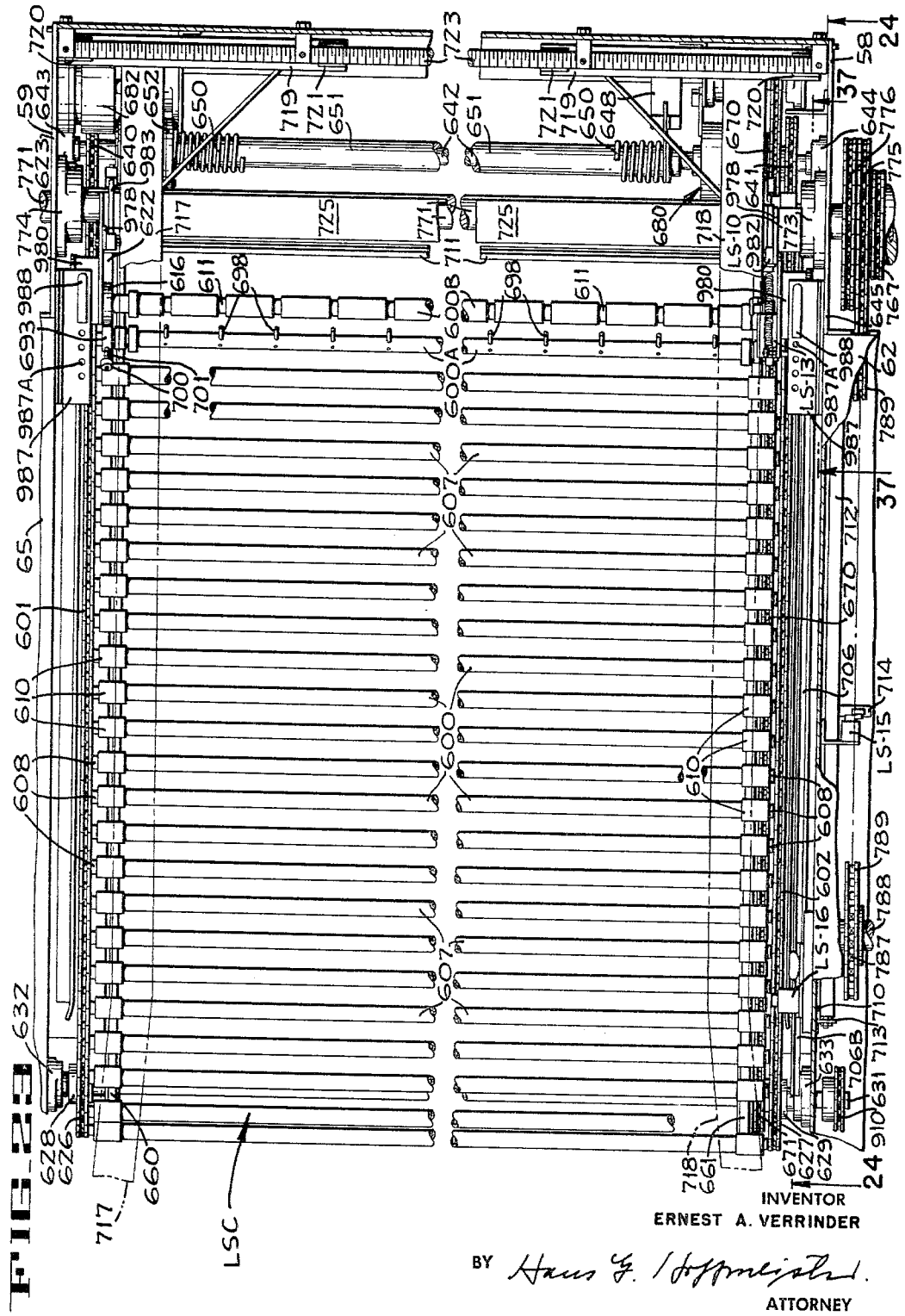

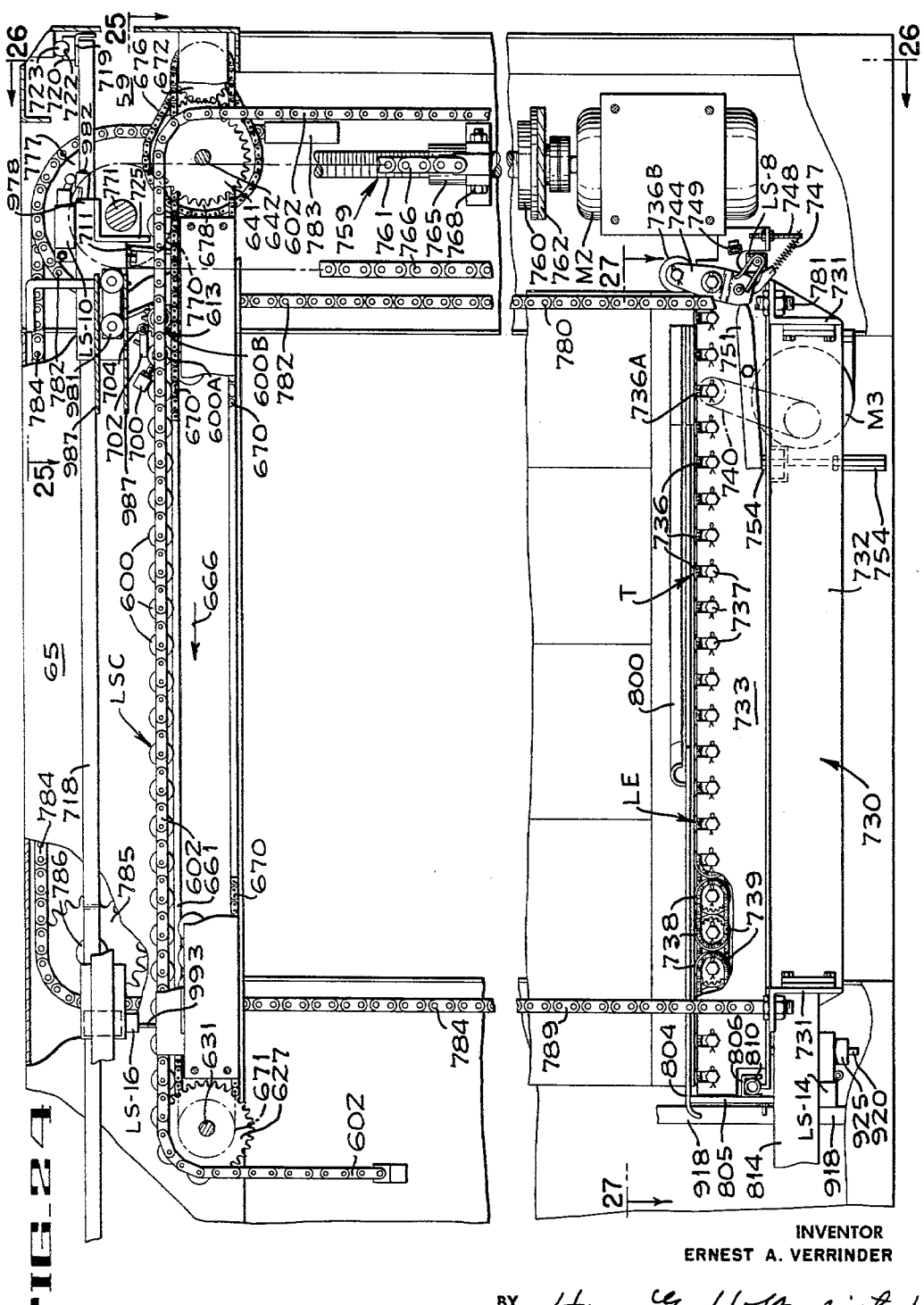

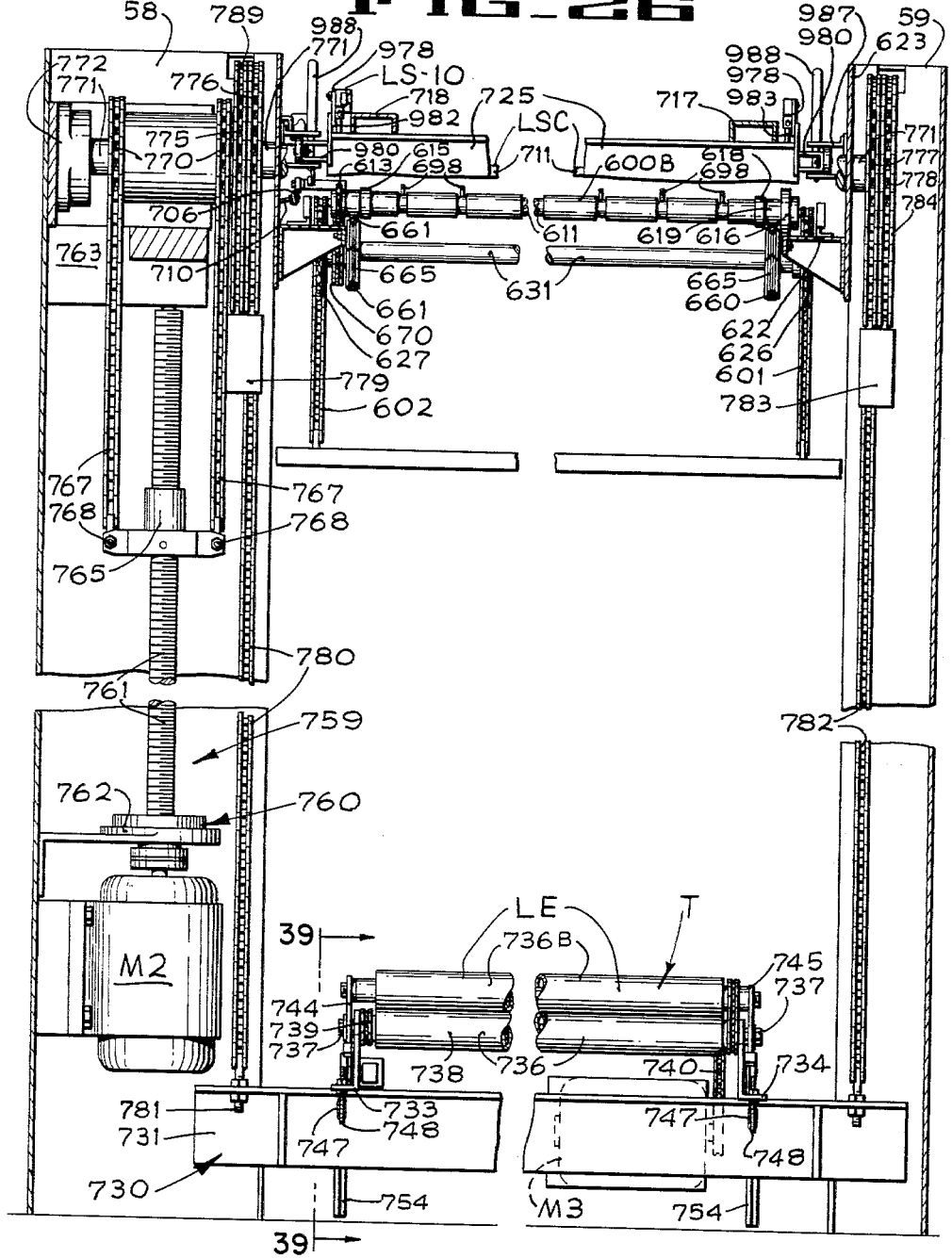

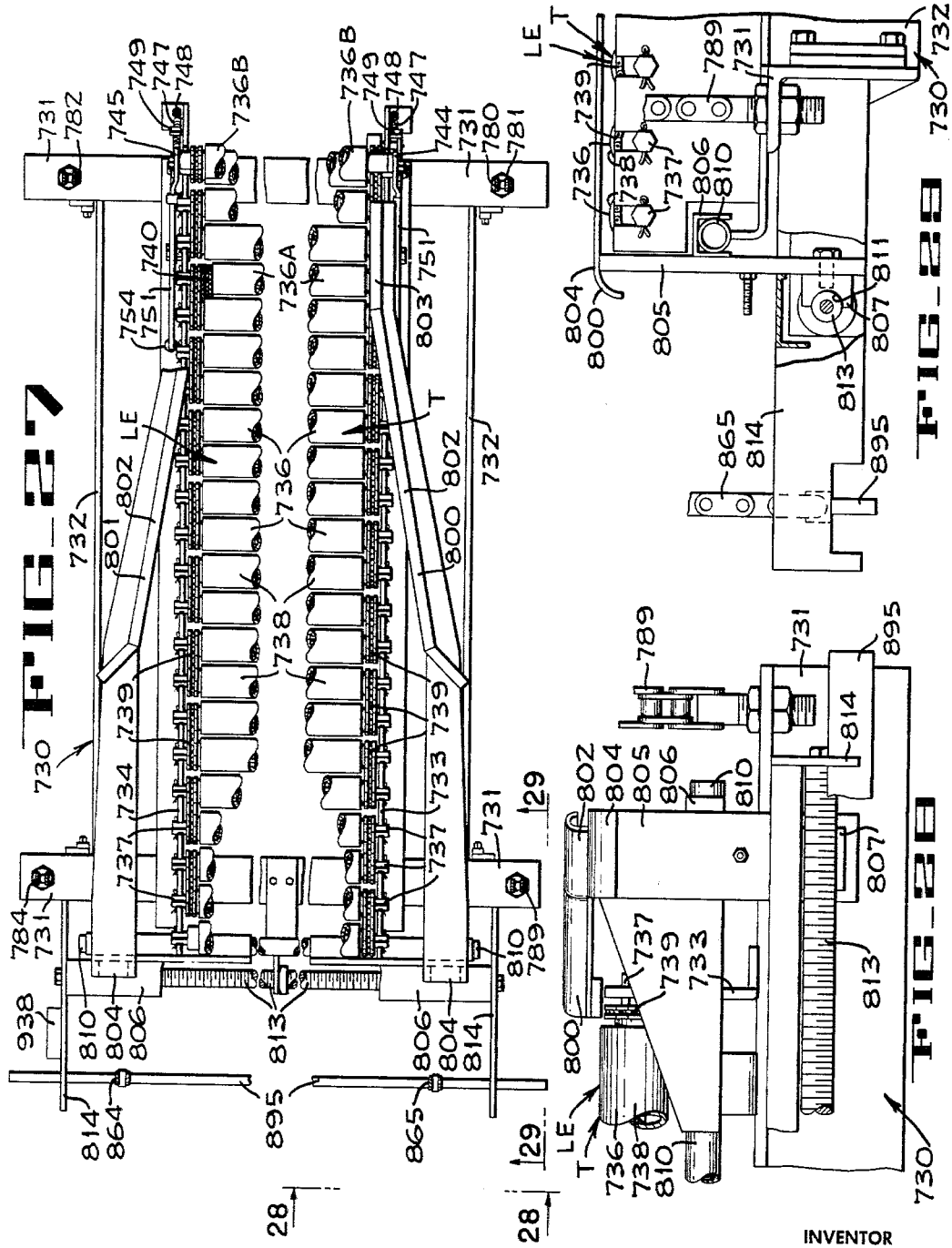

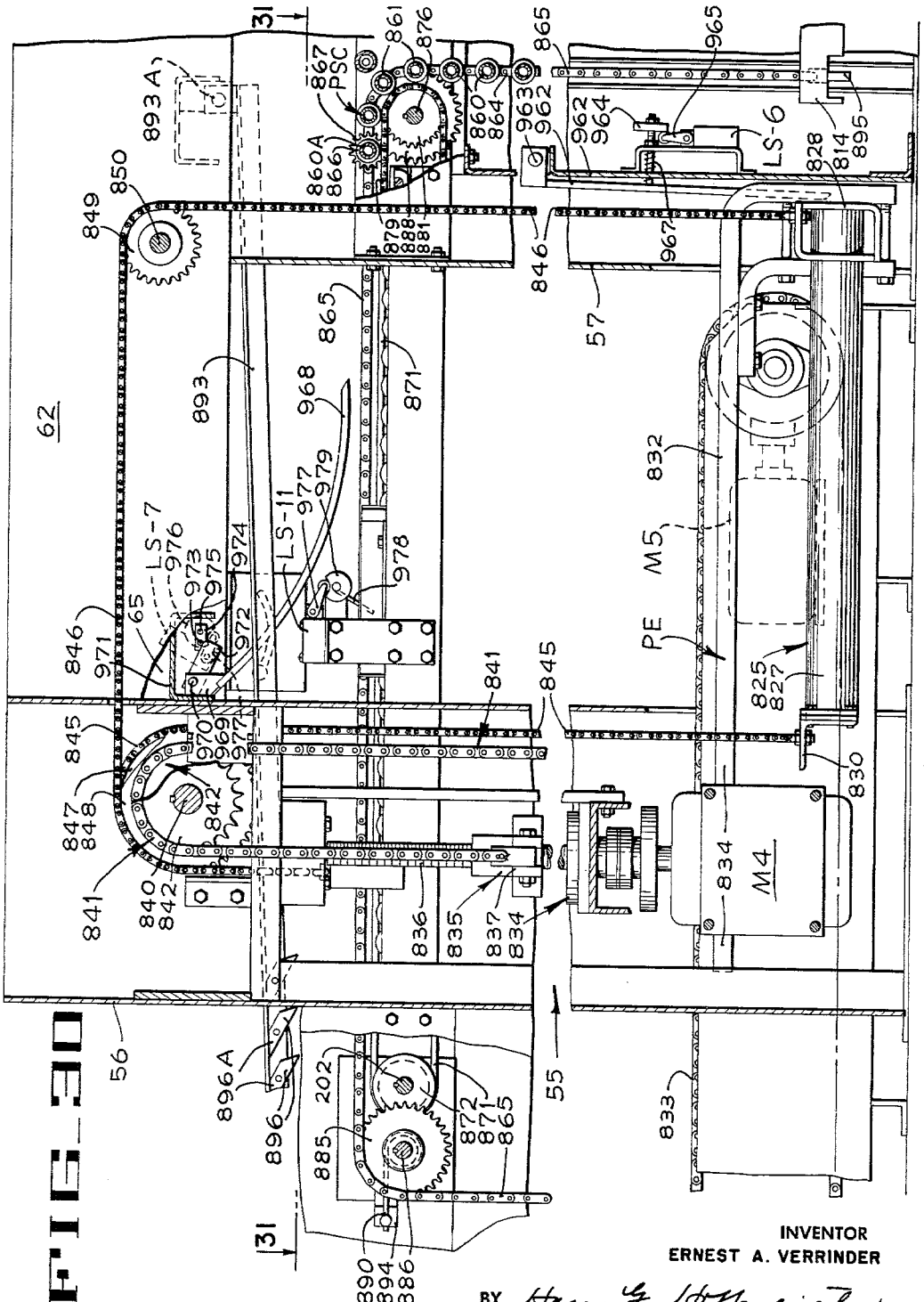

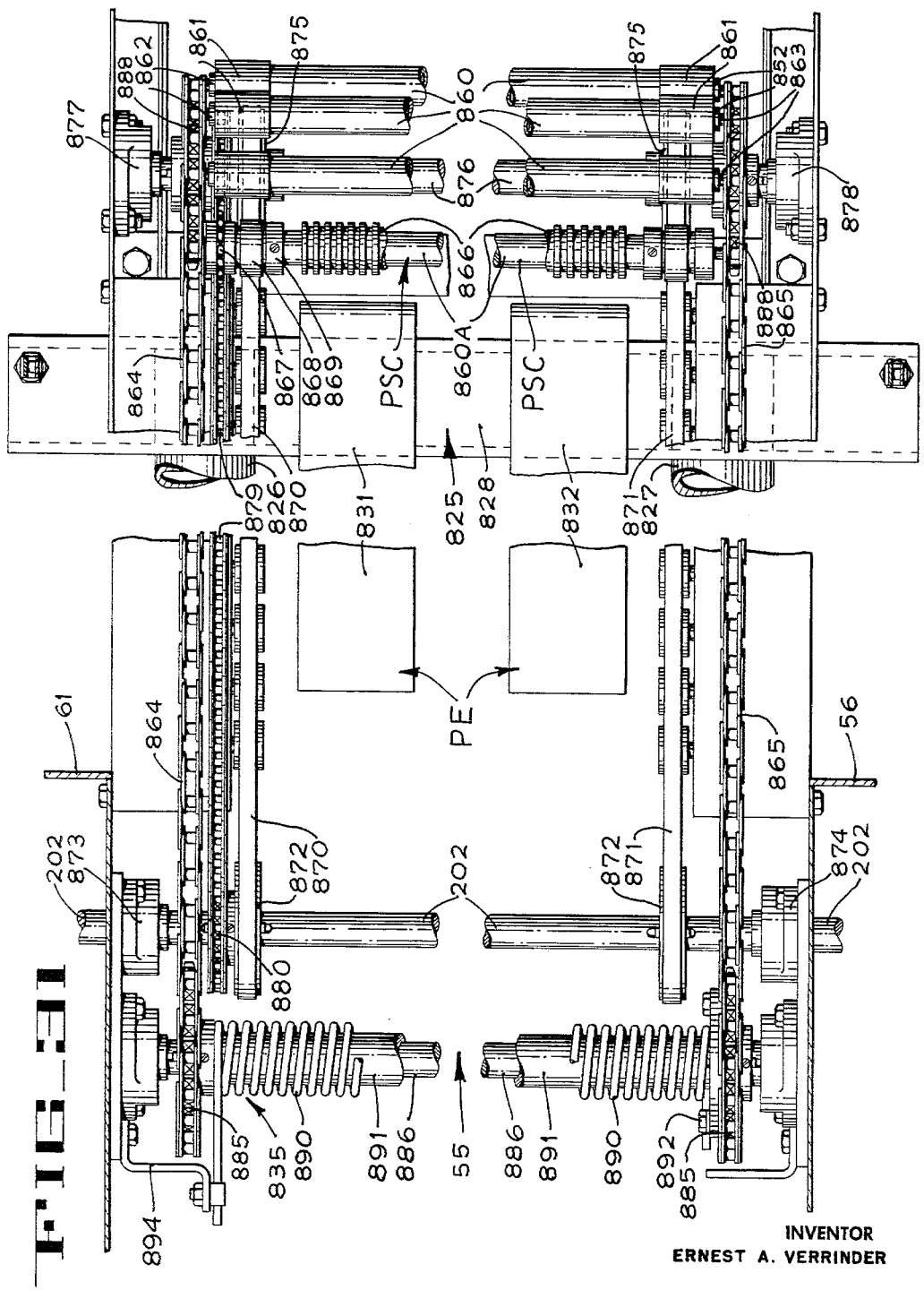

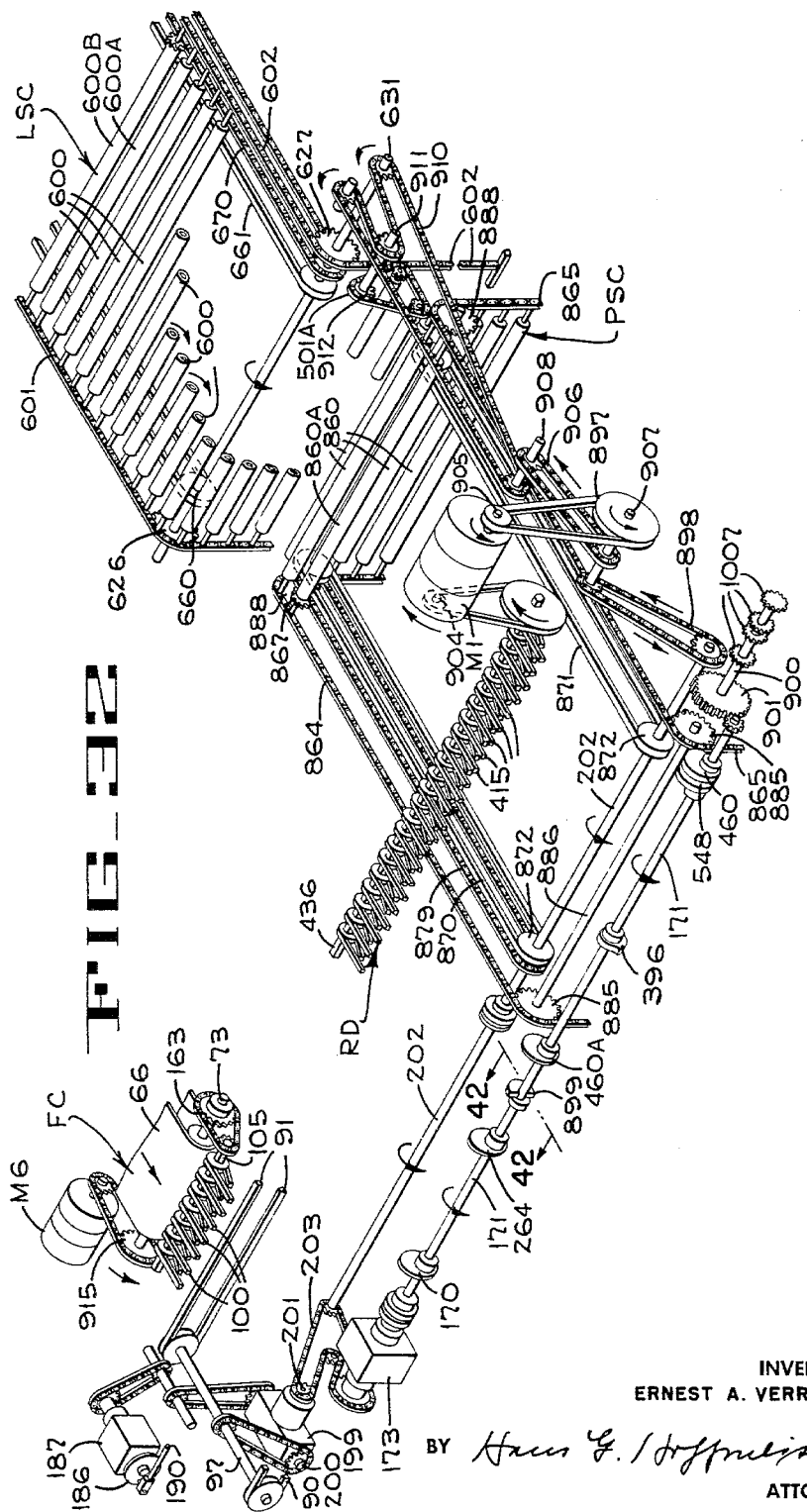

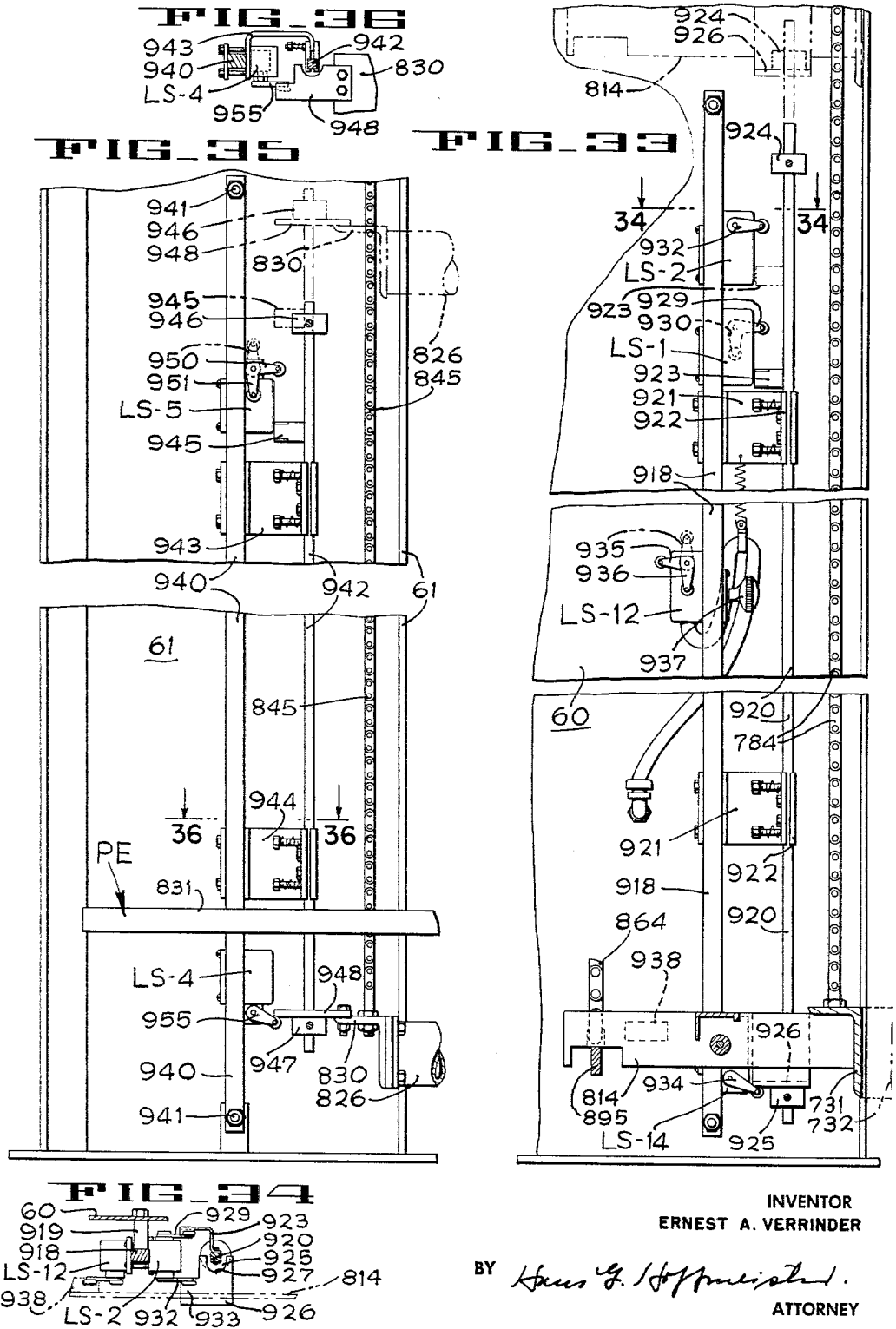

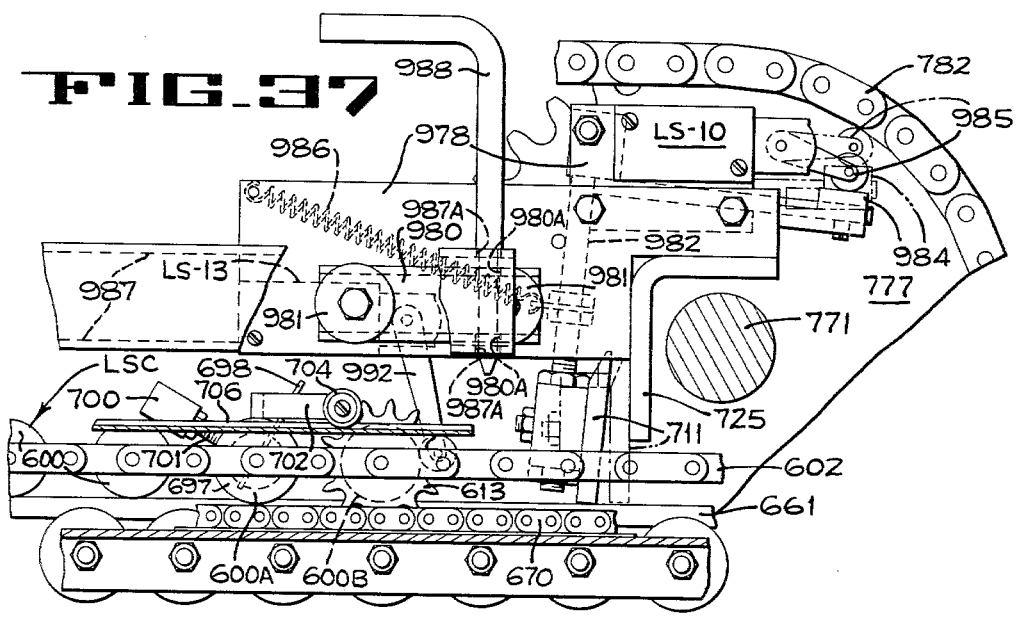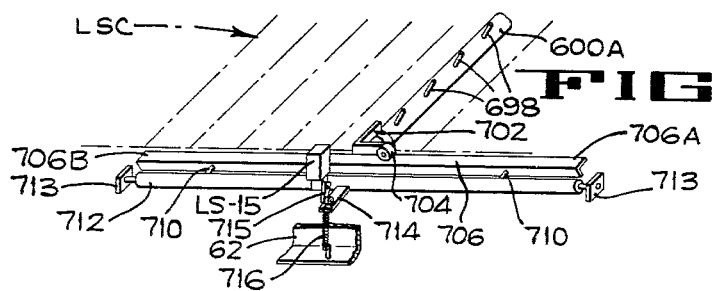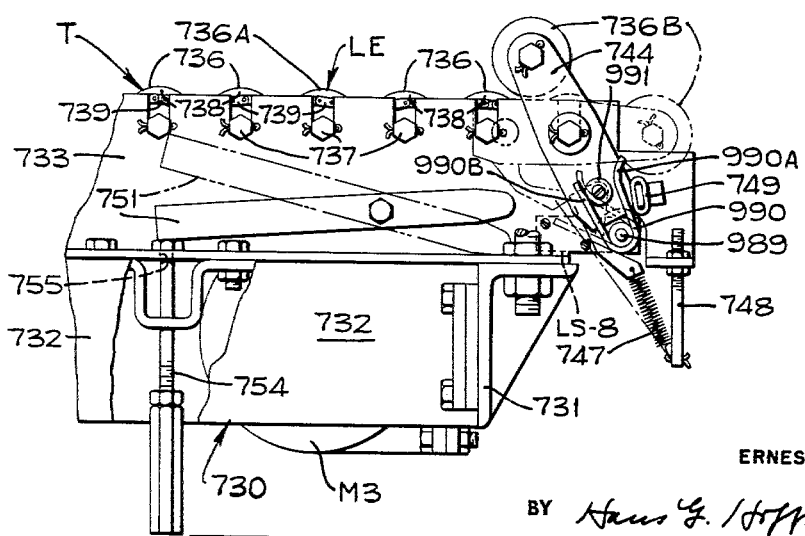

May 24, 1966 E. A. VERRINDER 3,252,594
ARTICLE HANDLING APPARATUS
Filed Dec. 26, 1962 25 Sheets-Sheet 23
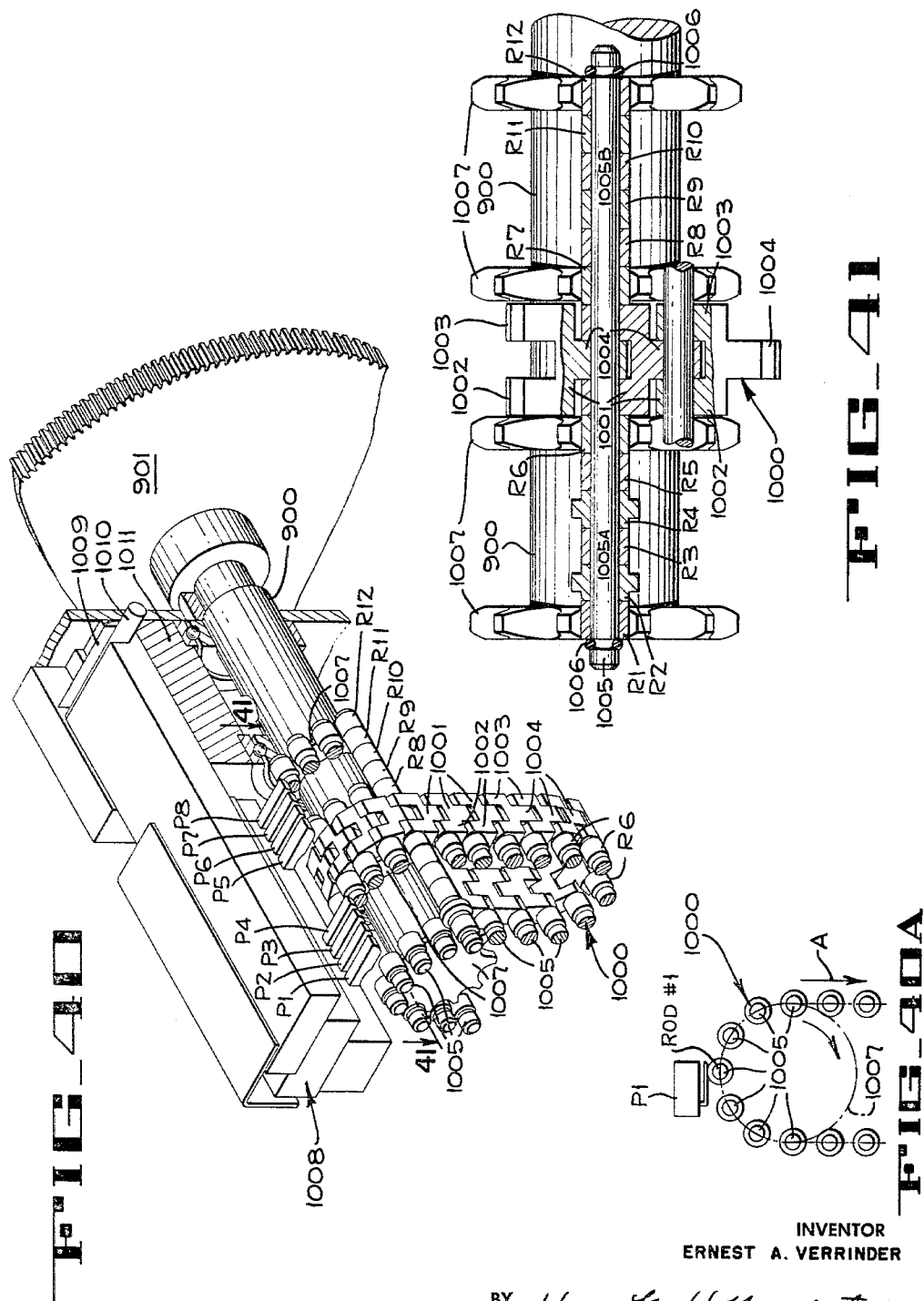
INVENTOR
ERNEST A. VERRINDER
BY Hans G. Hoffmeister
ATTORNEY May 24, 1966  E. A. VERRINDER  3,252,594
ARTICLE HANDLING APPARATUS
Filed Dec. 26, 1962  25 Sheets-Sheet 24
FIG_42
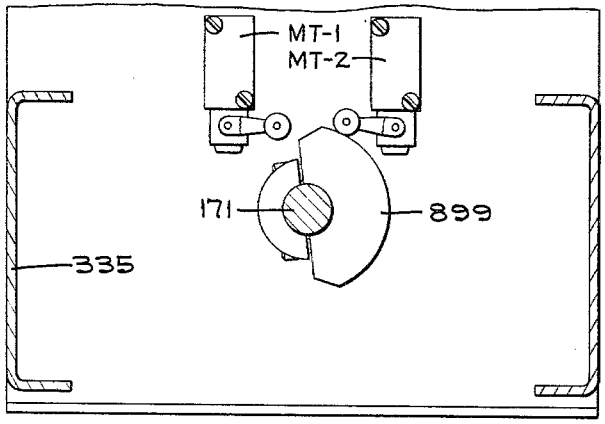
```
# 3 | # 2 | # 1
# 6 | # 5 | # 4
#10 | #9 | #8 | #7
```
```
#14 | #13 | #12 | #11
#17 | #16 | #15
#20 | #19 | #18
```
FIG_44  FIG_45
| CASE | ROLLER R2 P1 CASE TURN | ROLLER R3 P2 ROW DISCH. | ROLLER R4 P3 LAYER DISCH. | ROLLER R5 P4 GAP FORMER |
|---|---|---|---|---|
| ROD 1 | X | X | | |
| ROD 2 | X | | X | |
| ROD 3 | X | | | |
| ROD 4 | X | X | | |
| ROD 5 | X | | | |
| ROD 6 | X | | | |
| ROD 7 | | X | | |
| ROD 8 | | | | |
| ROD 9 | | | | X |
| ROD 10 | | | | |
| ROD 11 | | X | | |
| ROD 12 | | | X | |
| ROD 13 | | | | X |
| ROD 14 | | | | |
| ROD 15 | X | X | | |
| ROD 16 | X | | | |
| ROD 17 | X | | | |
| ROD 18 | X | X | | |
| ROD 19 | X | | | |
| ROD 20 | X | | | |
FIG_43
INVENTOR
ERNEST A. VERRINDER
BY Hans G. Hoffmeister
ATTORNEY May 24, 1966  E. A. VERRINDER  3,252,594
ARTICLE HANDLING APPARATUS
Filed Dec. 26, 1962  25 Sheets-Sheet 25
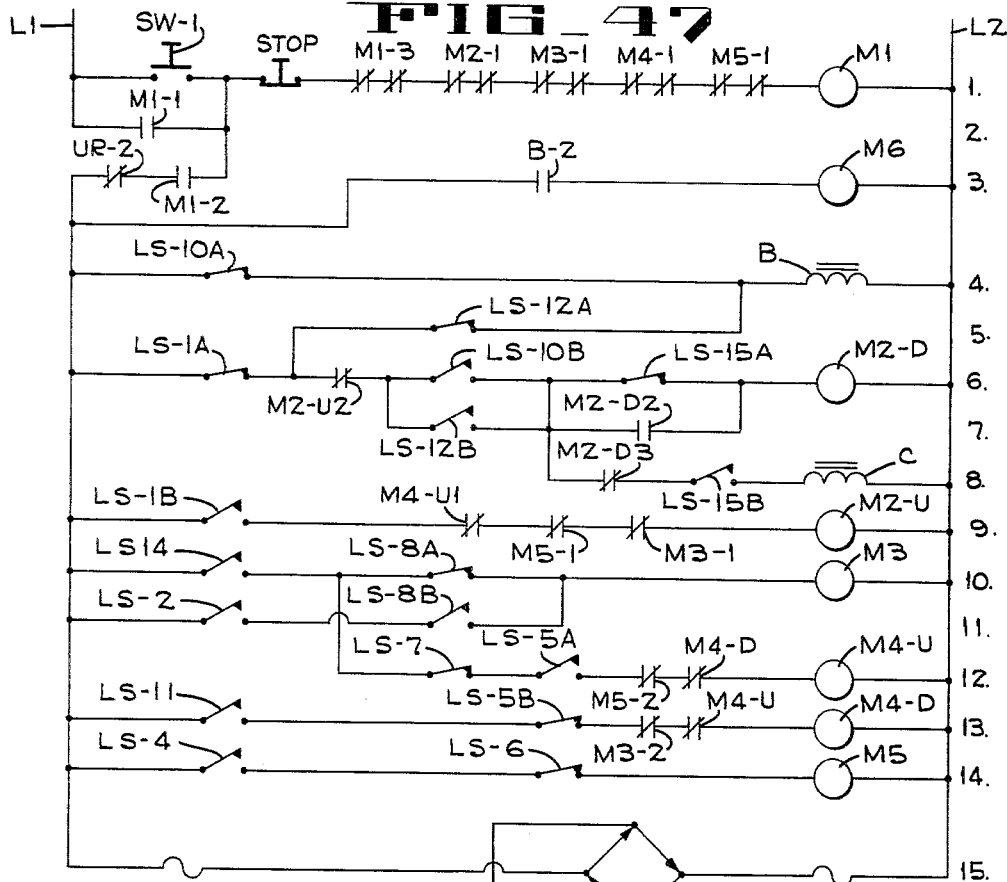
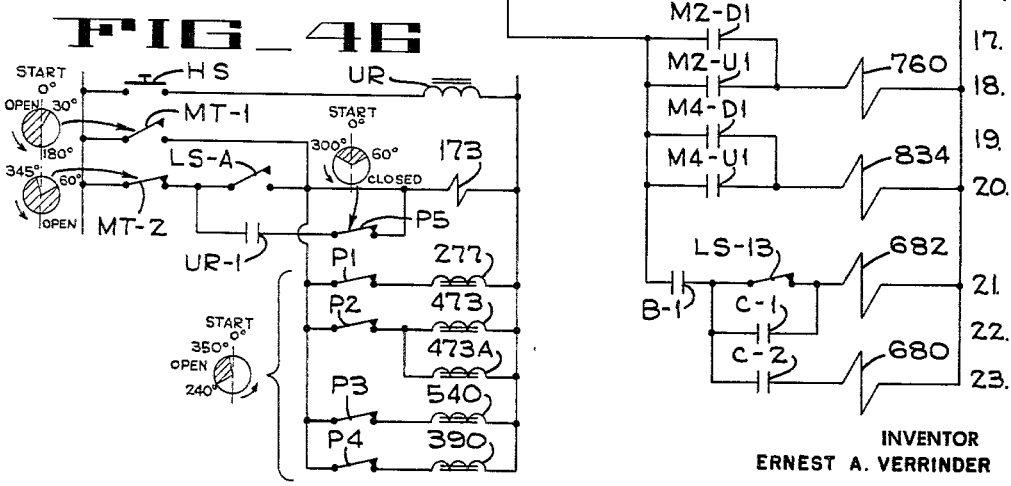
INVENTOR
ERNEST A. VERRINDER
BY *Hans G. Hoffmeister*
ATTORNEY United States Patent Office 3,252,594
Patented May 24, 1966

3,252,594
ARTICLE HANDLING APPARATUS
Ernest A. Verrinder, Riverside, Calif., assignor to FMC Corporation, San Jose, Calif., a corporation of Delaware
Filed Dec. 26, 1962, Ser. No. 247,081
2 Claims. (Cl. 214—6)

This invention pertains to article handling apparatus, and more particularly relates to a machine for stacking layers of articles, such as cases, on a pallet.

An object of the invention is to provide an improved apparatus for handling articles such as cases or packages.

Another object is to provide an efficient machine for arranging articles in a predetermined pattern on a support, such as a pallet.

Another object is to provide an improved mechanism for changing the direction of movement of articles traveling on a conveyor.

Another object is to provide an apparatus for quickly and accurately changing the orientation of articles traveling on a conveyor.

Another object is to provide an improved mechanism for centering articles on a conveyor.

Another object is the provision of a mechanism for changing the direction of movement of a row of articles without disorganizing the row.

Another object is to provide a mechanism for forming gaps between articles of a row of articles.

Another object is the provision of an improved mechanism for transferring a layer of cases from a conveyor to a pallet without affecting the orientation of the articles in the layer.

Another object is the provision of means for efficiently removing the uppermost pallet from a stack of pallets.

Another object is to provide an improved drive mechanism for a palletizer.

Another object is the provision of means for effectively controlling and sequencing the various operations of a machine that is capable of receiving articles one by one and arranging them in layers of predetermined patterns on a pallet.

Other and further features and objects of the present invention will be apparent from the following description taken in connection with the accompanying drawings, in which:

FIGURE 1 is a diagrammatic perspective of an article handling apparatus constructed in accordance with the teaching of the present invention.

FIGURE 2 is a diagrammatic plan of the machine of FIG. 1.

FIGURE 3 is a diagrammatic vertical section taken substantially on line 3—3 of FIG. 2.

FIGURE 3A is a fragmentary schematic view showing a part of a layer stripping operation.

FIGURES 3B-3C are fragmentary schematic views showing consecutive operations in the removal of a pallet from a stack of pallets.

FIGURE 4 is an enlarger fragmentary diagrammatic perspective of a portion of the machine of FIG. 1.

FIGURE 5 is an enlarged fragmentary diagrammatic plan of the portion of the machine shown in FIG. 4.

FIGURE 6 is a diagrammatic vertical section taken on line 6—6 of FIGURE 5.

FIGURE 7 is a diagrammatic vertical section taken on line 7—7 of FIG. 5.

FIGURE 8 is an enlarged diagrammatic plan of the case turning mechanism of the machine of FIG. 1.

FIGURE 9 is a vertical section taken on line 9—9 of FIG. 8.

FIGURE 10 is a fragmentary vertical section taken on line 10—10 of FIG. 9.

FIGURE 11 is an enlarged elevation of a cam follower unit shown in FIG. 9.

FIGURE 12 is an enlarged diagrammatic prespective of a portion of the machine of FIG. 1.

FIGURE 13 is a diagrammatic vertical section taken on line 13—13 of FIG. 12.

FIGURE 14 is a fragmentary diagrammatic side elevation taken looking in the direction of lines 14—14 of FIG. 13.

FIGURE 14A is an enlarged horizontal section taken on line 14A—14A of FIGURE 14.

FIGURE 15 is a fragmentary diagrammatic side elevation taken looking in the direction of line 15—15 of FIG. 13.

FIGURE 16 is a fragmentary diagrammatic plan of the portion of the machine shown in FIGURE 12.

FIGURE 17 is a vertical section taken on line 17—17 of FIG. 16.

FIGURE 18 is a fragmentary diagrammatic plan of the layer accumulator portion of the machine of FIG. 1.

FIGURE 19 is an enlarged vertical section taken on line 19—19 of FIG. 20.

FIGURE 20 is an enlarged vertical section taken on line 20—20 of FIG. 18.

FIGURE 21 is an enlarged fragmentary diagrammatic section taken on line 21—21 of FIG. 2.

FIGURE 22 is a vertical section taken on line 22—22 of FIG. 21.

FIGURE 23 is a fragmentary diagrammatic plan of the layer stripping zone of the machine.

FIGURE 24 is a fragmentary diagrammatic vertical section taken on line 24—24 of FIGURE 23.

FIGURE 25 is an enlarged, diagrammatic horizontal section taken on line 25—25 of FIG. 24.

FIGURE 26 is a fragmentary vertical section taken on line 26—26 of FIG. 24.

FIGURE 27 is a fragmentary horizontal section taken on lines 27—27 of FIG. 24.

FIGURE 28 is an enlarged vertical section taken on line 28—28 of FIG. 27.

FIGURE 29 is an enlarged vertical section taken on line 29—29 of FIG. 27.

FIGURE 30 is an enlarged, fragmentary diagrammatic vertical section taken substantially on line 30—30 of FIG. 2.

FIGURE 31 is an enlarged fragmentary diagrammatic horizontal section taken on lines 31—31 of FIG. 30.

FIGURE 32 is a diagrammatic perspective of a portion of the drive mechanism of the machine of FIG. 1.

FIGURE 33 is an enlarged, vertical section taken substantially on line 33—33 of FIG. 2.

FIGURE 34 is a horizontal section taken on line 34—34 of FIG. 33.

FIGURE 35 is an enlarged vertical section taken substantially on line 35—35 of FIG. 2.

FIGURE 36 is a horizontal section taken on line 36—36 of FIG. 35.

FIGURE 37 is an enlarged fragmentary vertical section taken substantially on line 37—37 of FIG. 23.

FIGURE 38 is a schematic perspective of one of the electrical control switches used in the present machine.

FIGURE 39 is an enlarge fragmentary vertical section taken substantially on line 39—39 of FIGURE 26.

FIGURE 40 is a fragmentary diagrammatic perspective of a program chain used in the present machine.

FIGURE 40A is a schematic end elevation of the program chain of FIG. 40.

FIGURE 41 is a generally horizontal section taken substantially on line 41—41 of FIG. 40.

FIGURE 42 is a vertical section taken through the portion of the machine indicated by line 42—42 of FIG. 32.

FIGURE 43 is a chart showing control settings of the program chain for carrying out a predetermined sequence of layer forming steps.

FIGURES 44 and 45 are schematic plans of a first and a second layer of cases, respectively, of a typical pallet load of cases.

FIGURE 46 is a circuit diagram for the switches of the program chain.

FIGURE 47 is a circuit diagram for a portion of the electric control circuit of the machine.

The embodiment of the palletizing machine of the present invention that is illustrated in FIGURES 1 and 2 comprises a feed conveyor FC arranged to deliver articles, such as cases, one-by-one to a case diverter conveyor CD which moves each article laterally onto a case turner conveyor CT. In order to form a stable layer of cases, certain of the cases must be turned while passing over case turner CT to an orientation at right angles to the orientation they had on the feed conveyor FC. In FIG. 2 it will be seen that cases C1–C9 have been turned 90 degrees while cases C10–C13 have their original orientation. After leaving the case turner, the cases are assembled in a row on a row accummulator conveyor RA, the leading case being abutting contact with a rotatable stop roller 50, mounted at a fixed position on the conveyor. When a row of cases has been assembled, it is raised off the row accummulator RA and conveyed onto a layer accummulator conveyor LA by a row diverter conveyor RD which has elevatable conveying elements disposed between the rollers of the row accummulator RA. A layer of cases, made up of several rows is assembled on conveyor LA, the leading row abutting a retractible stop roller 51. When a layer has been formed, the roller 51 is retracted permitting the layer of cases to move onto a layer stripper carriage LSC (FIGS. 2 and 3) which is in the form of a flexible chain made up of elongate rollers and is arranged to move from the generally horizontal, layer-receiving position shown in full lines in FIG. 3 to the generally vertical retracted position indicated by phantom reference line 52. As the carriage moves toward the retracted position, the layer of cases is dropped onto a pallet that is resting on a load elevator LE which is, at that time, in the phantom line position of FIG. 3.

After each layer of cases is formed in the machine and deposited on the pallet or on a layer of cases that was previously placed on the pallet, the load elevator, is lowered a distance equal to the height of the layer so that another layer can be positioned thereon. When a load consisting of the desired number of layers of cases has been formed on the pallet, the load elevator LE is lowered to a position in alignment with a discharge conveyor DC which carries the loaded pallet out of the machine.

When the loaded pallet has been removed from the machine, the elevator LE is raised to a position wherein the upper surfaces of rollers, forming the support surface of the elevator, are at substantially the same level, indicated by reference line X in FIG. 3, as the upper surfaces of rollers of a pallet stripper carriage PSC which is disposed within the support structure of the machine below the layer accummulator conveyor LA. The carriage PSC is a flexible roller chain similar to layer stripper carriage LSC and is arranged to remove the uppermost pallet from a stack of pallets on a pallet elevator PE in a pallet storage chamber 55 and move it onto the adjacent load elevator LE. After receiving the empty pallet, the elevator LE is raised to the layer-receiving position, indicated in phantom lines in FIG. 3, preparatory to receiving successive layers from the stripper carriage LSC.

In general, the support structure may be constructed of conventional rigid structural members secured together to provide a rigid frame adapted to support the several mechanisms of the machine. In the present embodiment the structure comprises a plurality of vertical members 56–61 which are box-like in construction in that they are made up of vertical plates welded together. These vertical members, which will be referred to as support posts, are interconnected by horizontal box-like members 62, 63, 64 and 65 which will be referred to as box beams.

The feed conveyor FC (FIGS. 2 and 4) is an endless belt conveyor and includes a belt 66 that is trained around a drive roller 67 and an idler roller 68, both rollers being supported in spaced side members 69 and 70 that are mounted on fixed support members 71 and 72 projecting from posts 61 and 59, respectively. The drive roller 67 is keyed to a shaft 73 which may be driven in any suitable manner, as by a motor M5 (FIG. 2). It will be understood that this feed conveyor may be part of a preceding case-processing machine and may be driven by the drive mechanism of that machine and of course, it may be supported by separate support structure. The belt 66 is made of a material, such as a rubber composition, suitable for supporting and advancing the particular type of case being palletized.

The case diverter conveyor CD comprises a plurality of parallel rollers 80 (FIGS. 2 and 4), each roller being a hollow type that has a bearing unit pressed in each end. A shaft 81 extends through the tube and through the bearing units and has end portions of hexagonal cross-section projecting from the tube to be received between upright spaced walls defining a groove 82 in the opposite side walls 83 and 84 of a box-like frame 85 that has spaced end walls 86 and 87 (FIG. 2). This frame is supported from the support structure of the machine by suitable members including a plurality of triangular plates 88 (one only being shown in FIG. 1). The frame 85 encloses the case diverter CD, the case turner CT, the row accumulator RA, and the row diverter RD. Thus, the eight rollers 80 of diverter CD provide a conveying surface which, when energized, will convey any cases supported thereon in a direction at right angles to the direction in which they enter the machine on feed conveyor FC.

The rollers 80 are rotated by the upper runs of two rubber belts 90 and 91 (FIG. 4), which contact the underside of each roller in frictional driving engagement. At one end, each belt is trained around a drive pulley 92 (FIG. 2) that is keyed to a shaft 93 which is rotatably mounted in brackets 94 mounted on end wall 87 of frame 85. At its opposite end (FIG. 5), each belt is trained around a pulley 96 that is keyed to a shaft 97 which is rotatably journalled in bearing units 98 carried by two brackets 99 that project inwardly from the wall 86 of the frame 85.

The cases are moved from the feed conveyor belt 66 to a position above the rollers 80 by means of a plurality of relatively thin V-belts 100 (FIG. 4). Each belt is disposed between two adjacent rollers 80 and, at one end, is trained around a grooved drive pulley 102 and at the other end around a grooved idler pulley 103. Each drive pulley 102 is keyed to a hexagonal shaft 105 which is supported for rotation in three spaced bearings 106, 107 and 108 (FIG. 5) which are mounted on and project upwardly from an inverted channel 109 (FIG. 4) that extends across the discharge end of feed belt 66 adjacent to and below the drive shaft 73. At each end the channel 109 is welded to the upper surfaces of two spaced channel beams 110 which are parallel to the belts 100 and are also secured together by an end channel 112 and by a central channel 115. It will therefore be noted that the two spaced channel beams 110 and the interconnected transverse channel members 109, 112 and 115 make up a rigid pivot frame 116 and, as seen in FIG. 4, this frame includes two upstanding plates 118 which are pivotally mounted on a transverse shaft 120. At each of its ends the shaft 120 extends through a boss 122 welded to the plate 118 and a similar boss 123 (FIG. 5) welded to the adjacent structural member 70 or 69.

The idler pulley 103 at the downstream end of each of the V-belts 100 is rotatably mounted in opposed walls at the upper end of a bracket 132 (FIGS. 4 and 6). The bracket is pivotally mounted at 133 in a block 134 which is carried by one end of a bolt 135 that is locked by nuts in the channel 112. Each bracket is urged in a counter-clockwise direction (FIG. 6) around pivot point 133 by a spring 140 which is disposed between a nut on a bolt 141 and the channel 112. The bolt 141 passes through opening in the channel 112 and in the bracket 132. Thus, the spring 140 acts as a belt tightener, causing the upper run of the associated belt to be taut and causing the lower run to engage a guide roller 145 that is rotatably mounted on the central channel 115. The lower runs of the belts 100 also ride over the surface of a transverse roller 146 (FIG. 4) which is rotatably mount- in upstanding arms 148 of angle brackets 159 whose lower ends are welded to the longitudinal beams 110. Further, the upper run of each belt travels in a guide trough 161 (FIG. 6) which has a generally H-shaped cross-section and is supported by brackets 162 projecting upwardly from the channel 112 and from the central channel 115.

The V-belt drive shaft 105 is driven from the feed conveyor drive shaft 73 by means of a sprocket and chain drive 163 (FIG. 6).

The frame 116 on which the V-belts are mounted is raised and lowered under the control of a cam 170 (FIG. 6) that is keyed to a camshaft 171 and is in contact with a roller follower 172. The follower 172 is rotatably carried on the lower end of a rigid post 174 which is secured to and projects downwardly from a cross beam 175 of the frame 116. As will be explained presently, the camshaft 171 is rotated one complete revolution, by means of a one-revolution electrically operated clutch 173 (FIG. 6) each time a case moves over the belts 100. The clutch may be a Hilliad intermittent drive unit with a positive stop. When the camshaft 171 is stationary, the frame 116 is held in a raised position wherein the upper runs of the V-belts are at a level above the lever of the upper surfaces of the rollers 80. Accordingly, each case leaving the discharge end of the feed conveyor belt 66 passes onto the elevated belts and moves to a position above the rollers 80. As it moves toward the wall 83 (FIG. 5) the case engages an actuator 178 of a switch LS–A causing a control operation which results in one revolution of the camshaft 171. As the camshaft rotates, the frame 116 is permitted to lower until the upper runs of the V-belts are below the surfaces of the rollers 80 and the case is resting on these rollers. At this time the rollers 80 are being rotated counterclockwise (FIG. 4) and the case is, accordingly, conveyed toward the case turner CT.

When cases are advanced on the V-belts 100 at a rate of about 50 cases per minute, the rollers 80 will effectively divert the cases when the cases are deposited thereon. At higher speeds, the cases tend to overtravel as they are deposited on the rollers. To arrest the movement of these high speed cases, a case pusher CP (FIG. 5) is provided which includes a rectangular pusher frame 180 which has four rollers 181 riding in tracks provided by two spaced upwardly-opening channels 182. One leg of an angle bar 183 overlies each channel to prevent upward movement of the rollers in the channel, and each angle bar and each channel is secured to a rigid support bar 184 that extends between the walls 83 and 84. Cases are guided to a position in front of the pusher frame 180 by a guide bar 185 which extends to a point above the discharge end of feed conveyor belt 66. The frame 180 is reciprocated back and forth by means of a crank disk 186 (FIG. 7) which is keyed to the output shaft of a gear box 187 and pivotally mounts one end of a push rod 190 that is secured, at its other end, to the rear member of frame 180.

The input shaft of the gear box 187 is driven by a chain 194 that is trained over a sprocket 195 (FIG. 7) keyed to a jack shaft 196 which, in turn, is driven by chain 197 from one take-off shaft 198 of a gear box 199. The gear box 199 has a second power take-off shaft 200 and an input shaft 201 (FIG. 7) which is driven through a chain and sprocket drive 203 by a power driven shaft 202 which extends longitudinally of and is disposed below the frame. The chain and sprocket drive 203 also drives the drive element of a one-revolution clutch 173 which, when engaged, rotates the camshaft 171 through one complete revolution.

The second take-off shaft 200 of gear box 199 drives the drive shaft 97 (FIG. 6) which drives the belts 90 and 91 that underlie and frictionally drive the rollers 80 of the case diverter conveyor CD.

The case turner CT (FIGS. 2, 8 and 9) comprises two sets 220 and 221 of identical rollers 222. As will be explained more fully presently, when a case is to be turned through 90°, the rollers of set 221 are stopped to create a frictional drag on the undersurface of the case while the rollers of set 220 continue driving and cause the case to pivot using the stationary rollers as a fulcrum. Accordingly, the rollers of set 220 will be called turning rollers, and the rollers of set 221 will be called control rollers. Each roller 222 consists of a tube 223 having a bearing 224 pressed in each end, and a shaft 225 that extends through the bearings and through the tube and has end portions of hexagonal cross-section. Each of the rollers of set 220 has one end disposed in a vertical slot 228 in the wall 83 of the box frame 85 and its opposite end disposed in an aperture 229 (FIG. 9) in one of two angle support members 230 that are secured to and project upwardly from a cross brace 231 which together with a cross brace 232 rigidly connect the walls 83 and 84 of frame 85.

The belts 90 and 91, which drive the rollers 80 of the case diverter CD, also engage the bottom surface of rollers 222, belt 90 engaging the rollers of set 220 and belt 91 engaging the rollers of set 221. The rollers of set 220 are continuously driven by belt 90, but the rollers of set 221 are arranged to be selectively lifted out of engagement with their driving belt 91 by a lever 240 (FIG. 9) which includes a generally square, rigid frame member (FIG. 8) made up of side memebrs 241A, 241B, 241C and 241D. A lifter bar 243 is secured by bolts 244 to the side member 241B, and a contact plate 245 is secured by capscrews 246 to bar 243. A facing strip 247 of relatively yieldable material, such as cork, is secured as by an adhesive to the upper surface of plate 245.

The side members 241A and 241C of lever 240 are provided with hubs 249 which rotatably receive a shaft 250 (FIG. 8) that is secured between two fixed posts 251 and 252 (FIG. 8), the post 251 projecting upwardly from the fixed cross brace 232 and the post 252 projecting upwardly from the fixed cross brace 231. A U-shaped lifting arm 260 (FIG. 10) has opposite members 260A and 260B welded to the side members 241A and 241C, respectively, and a link 261 is secured to and projects downwardly from the base of U-shaped arm 260 to support a selectively activated cam follower unit 262 (FIG. 9) which includes a cam follower roller 263 that rides along the surface of a cam 264 keyed to camshaft 171. The unit 262 includes a mounting block 266 which is bolted to the link 261 and pivotally supports a lever 267 on which the follower 263 is rotatably mounted. A latching lever 270 is also pivotally supported on block 266, being movable from the lowered position, shown in full lines in FIG. 11, to the upper, phantom line position on FIG. 11 wherein its flat end face 270A is opposite a flat side surface 267A of the follower support lever 267. The latching lever 270 is normally urged to its lowered position by a compression spring 272 which is positioned in an elongate recess 273 in the block 266 and engages a short push rod 274 that bears against the latching lever. A solenoid 277, which is mounted on block 266, has its armature connected to the latching lever by a spring 278 so that, when the solenoid is energized, the lever will be pivoted upwardly to position its end face 270A opposite the side face of lever 267. Then, the next time the cam 264 urges the lever 267 in a counterclockwise direction, the follower 263, the latching lever and the block 266 will act as a rigid member and cause the box-type lever 240 to swing counterclockwise about shaft 250 to raise the lifter bar 245 (FIG. 9) and the facing strip thereon into contact with the undersurface of the rollers 222 of roller set 221. Accordingly, each roller is raised out of engagement with the drive belt 91 and into engagement with a brake member in the form of a plurality of bolts 280, each of the bolts 280 being secured in an angle bar 281 which is secured to the support post 61.

Referring to FIG. 1, it will now be evident that the rollers of roller sets 220 and 221 of the case turner CT are continuously driven by the underlying drive belts. Accordingly, cases that are diverted by the case diverter CD and case pusher CP are carried sidewise over the rollers of the case turner and onto the row accumulator section RA. However, if a case is to be turned so that it will have a new orientation, the solenoid 277 is actuated to raise roller set 221 away from the drive belt 91 and against the positive brake member 280. As the rollers of set 220 continue to advance the package, the stationary rollers of set 221 frictionally grip the underside of the case, causing it to pivot counterclockwise (FIG. 2) to its new oriented position.

A particular feature of the case turner CT is illustrated in FIG. 9 wherein it will be noted that the axes of the rollers 222 of each set of rollers are inclined downwardly and inwardly so that only the side edges of the bottom of a case C, indicated by phantom lines, engages the rollers. Since the lower surfaces of many cases are uneven, difficulty was experienced in effecting a reliable frictional gripping engagement between said lower case surfaces and stationary control rollers when the rollers are horizontal. With the inclined arrangement of FIG. 9 the edge of the cases provide contact surface which effects a reliable uniform engagement with the cases and makes it possible to accurately coordinate the number of rollers, the size of the rollers, and the surface material of the rollers so that a wide range of cases can be effectively turned. Also, it will be evident that the inclined disposition of the rollers results in an automatic centering action on cases that are being conveyed over the rollers without being turned.

The row accumulator RA (FIGS. 2 and 12) comprises a plurality of rollers 300 which are identical to the rollers 222 in design. Each roller 300 has one hexagonal end portion disposed in a vertical slot 301 (FIG. 12) in side wall 83 and the other end portion in a vertical slot 302 in the wall 84. The previously mentioned stop roller 50 is secured to two spaced upstanding plates 304 and 305 (FIG. 1), plate 304 having two vertical spaced pins 306 disposed in one of the slots 301 and plate 305 having two identical pins 307 disposed in the opposite slot 302. Since the pins on the ends of the plates 304 and 305 are slidably disposed in the associated slots, it is evident that the roller 50 can be operatively disposed in any pair of aligned slots 301 and 302 in the walls 83 and 84 so that the point at which the leading box of each row is stopped can be varied merely by removing one of the rollers 300 and replacing it with the roller 50. Accordingly, the replaceable roller 50 provides means for accurately locating the side edge of the layer of articles of each pattern so that the position of the layer and the position of the pallet onto which it is to be deposited can be coordinated.

Referring to FIG. 2 it will be noted that in the formation of a typical layer of cases, the first three rows of cases, including cases C1–C9 were turned 90° on the case turner CT while the fourth row of cases including cases C10–C13 were assembled in their original orientation on the row accumulator RA. In order that the trailing edge of case C13 be in alignment with the trailing edges of cases C3, C6, and C9, it is necessary to provide a gap between certain cases of the fourth row of cases as it is formed on the row accumulator. While the gap could be formed between cases C10 and C11, or between cases C12 and C13, in the present example the gap is formed between cases C11 and C12 and this is accomplished by means of an elevating mechanism 310 which is effective to engage the end of a particular roller 300A adjacent side wall 83 and swing said end upwardly, causing the roller to pivot about its opposite end. As a result, a substantial portion of the roller 300A is disposed in the path of movement of case C12 after case C11 has already passed over said roller.

The elevating mechanism 310 comprises a threaded push rod 320 (FIGS. 13 and 14) that has yokes 321 and 322 adjustably threaded on its upper and lower ends, respectively. The upper yoke 321 carries a transverse pin 323 which passes through an opening in the hexagonal end of roller 300A to pivotally connect the roller to the push rod. The lower yoke 322 carries a pin 328 which extends through a slot 329A in one end of a lever 329 to pivotally connect the lever to the push rod. The lever 329 is pivoted at its opposite end on the lower end of a bar 331 which is secured to and projects downwardly from an angle plate 333 that is supported by two channel members 334 and 335 which are part of the structure that connects the frame 85 to the main support structure of the machine.

The push rod 320 is urged upwardly by a spring 340 which is connected between a collar 342 secured to the push rod and a support frame 343 mounted on and projecting upwardly from the side wall 83. A spring 345 is connected between a second collar 346 on the push rod 320 and the outermost end of lever 329. The push rod 320 is movable between the lowered position illustrated in FIG. 14 and an elevated position wherein the axis of roller 300A is in the position indicated by phantom line 350, and it is normally held in lowered position by a horizontal plate 352 that is mounted on a channel 353 which is part of a vertically movable belt carrying frame 354 to be described presently. The plate 352 overlies a block 355 which has a lowered end portion adjustably threaded into the upper end of a latching lever 356. The latching lever is pivotally mounted at its lower end on the lever 329 by means of a shoulder screw 357. A tension spring 360, that is connected to the latching lever and to a fixed post 362 which is secured to and projects upwardly from the angle plate 333, urges the latching lever 356 in a clockwise direction about screw 357 until the lever abuts a capscrew 364 that is threaded in the fixed bar 331. A second latching lever 365 is pivotally mounted on screw 357 and is disposed in side by side relation with lever 356. The lever 365 is shorter than lever 356 and has an upper end surface underlying an arm 366 formed on a plate 368 secured to the post 362.

The longer latching lever 356 is moved from its latched position under the horizontal plate 352 by a push rod 370 which has one end slidably disposed in an opening in the post 362 and has a yoke 371 at its opposite end that is pivotally connected to a cam follower lever 372. The lever 372 is pivotally mounted by means of a shoulder screw 373 on a bracket 374 which is welded to the angle plate 333. A latch lever 378 is pivoted at 379 on an upstanding leg 333A of angle plate 333, and has a recess 380 at one end which receives a shoulder screw 381 carried by the follower lever 372 to prevent counterclockwise pivotal movement of lever 372. A spring 385 is connected between the latch lever 378 and the fixed bracket 374 to urge the lever 378 in a counterclockwise direction into latching engagement with shoulder screw 381. A solenoid 390, which is mounted on the angle plate 333 has its armature connected by a spring 391 to the latch lever 378 and, accordingly, when the solenoid is energized, the lever 378 will be pulled in a clockwise direction and will release the shoulder screw 381, permitting the follower lever 372 to rotate counterclockwise about screw 373 under the urging of a spring 395 connected between the upper end of lever 372 and the post 362. The follower lever 372 will not actually swing counterclockwise, however, until a cam 396 on the camshaft 171 permits a roller 397 on the lower end of the lever to ride down an inclined portion of the camming surface along which it rolls.

When the cam 396 does permit the follower lever 372 to swing counterclockwise, the push rod 370 engages the latching lever 356 and pivots it counterclockwise out of latched engagement with the plate 352. A laterally projecting arm 397 carried by the long lever 356 engages the short lever 365 and moves it out of engagement with the latch arm 366. As soon as this dual unlatching action is completed, the spring 340 draws the push rod 320 upwardly to raise the associated roller 300A into the path of a case being advanced on the rollers 300. A stud 399 is mounted on angle plate 333 in the path of upward movement of lever 329, the contact of lever 329 with stud 399 being effective to limit the upward movement of the push rod 320.

The support frame 343 (FIG. 13) in which the upper end of spring 340 is anchored, comprising two spaced vertical rigid straps 400 and 401 each of which is disposed inwardly of the side wall 83 of frame 85 and is of stepped configuration in cross-section (FIG. 14A) having a portion 402 disposed in one of a plurality of cutouts 403 (FIG. 12) formed in the wall 83. A lock plate 404 (FIG. 13) is disposed on the outer side of wall 83, opposite each strap 400 and 401 and capscrews 405 (FIG. 13) secure the straps 400 and 401 to the plates 404, locking the frame 343 in position on the wall. A spacer block 406 is secured by the capscrew 405 to the inward side of each strap 400 and 401, and a piece of belting 407 is secured to the block 406 that is connected to strap 400. A fragmentary cylindrical recess 412 (FIG. 13) is formed in one side edge of the belting to receive and retain the roller 300A when it is in raised position.

After a complete row of cases has been formed on the row accumulator, the belt carrier frame 354 is swung upwardly to lift the cases off the rollers 300 and convey them onto the layer accumulator conveyor LA, as previously mentioned. During this upward movement of the frame 354, the plate 352 (FIG. 14) is raised to a position higher than the upper end of the block 355 on latching lever 356. If at this time the solenoid 390 has been de-energized, the spring 385 and cam 396 will latch the lever 372 in the position of FIG. 14, permitting the spring 360 to pivot the long latching lever 356 clockwise against stop 364 to position block 355 below the elevated plate 352. Subsequent downward movement of the belt carrier frame 354 causes the plate 352 to engage the block 355 to move the lever 356 downwardly. Thus, the shoulder screw 357, the short lever 365 and the lever 329 are also moved downwardly. As soon as the upper end of the short lever 365 is below the level of the latch arm 366, a spring 361 will swing the lever clockwise to a position underlying latch arm 366 and abutting the arm 397 of the long latching lever 356. The case stop roller 300A is now in its lowered position, out of the path of cases advancing on the row accumulator conveyor.

Referring to FIGS. 12 and 16, it will be noted that a relatively thin conveyor belt 415 of the row diverter RD is mounted alongside each roller 300, the upper surface of each belt being arranged to travel from left to right in FIG. 16. Normally the upper surfaces of these belts 415 are below the level of the upper surfaces of the rollers so that the belts will not interfere with the formation of a row of cases on the row accumulator. When a row of cases has been assembled, the belts are pivoted about a pivot axis adjacent their right ends, causing the left side of each belt to be raised to lift the row of cases off the rollers 300 and convey them to the right (FIG. 16) to deliver them to the layer accumulator LA which is adjacent the right hand ends of the belts 415.

In order to accomplish the simultaneous upward movement of all of the belts 415, the belts are mounted on the support frame 354 which includes two side channel members 418 and 419 (FIG. 16), the channel 353, and two end members 420 and 421, all secured together to form a rigid unit. The end member 421 is a rigid tube that is welded to blocks 422 and 423 which are bolted to the side channels 418 and 419, respectively. The frame 354 is journalled for pivoting movement on two stub shafts in the form of shoulder screws 425 and 426, each screw having a head 427 disposed inside the associated channel 418 or 419, an unthreaded central portion that extends through the channel and pivotally supports a bearing 431 which is bolted to the outer side of the channel and a threaded end disposed in a tapped hub 428 or 429, said hubs being bolted to wall members of the horizontal box beams 61 and 62, respectively.

At one end, each belt 415 is trained around a drive pulley 435 which is keyed to a hexagonal shaft 436 that is journalled for rotation in bearings 437 and 438 carried by the side channels 418 and 419, and in a central bearing 439 that is mounted on the tubular member 421. At its opposite end, each belt is trained over a pulley 440 that is rotatably in opposed walls at the upper end of a bracket 445 which is pivotally mounted in spring-loaded position on the end member 353 of the support frame 354 in exactly the same manner in which the previously described brackets 132 (FIG. 6) are mounted. The lower run of each belt 415 rides over guide pulleys 446 and 447 (FIG. 17) and the upper run travels in an H-shaped guide trough 448 which is supported in brackets 449 and 450.

The frame 354 of the row diverter on which the V-belts 415 are mounted is pivoted upwardly about an axis defined by the aligned stub shafts 425 and 426 by means of two identical spaced cams 460 (one only being shown in FIG. 17) keyed to camshaft 171 which, as previously mentioned, is periodically rotated through one revolution by a one-revolution clutch. When the camshaft is stationary, the frame 354 rests on the fixed channel 335 and the upper surfaces of the belts are below the level of the upper surfaces of the case-supporting rollers 300. During rotation of the camshaft 171 the cam 460 engages a roller follower 465 which is part of a selectively actuated cam follower unit 466 that is identical to the previously described follower unit 262 but is oriented in a slightly different manner. The follower 465 is rotatably mounted on an arm 470 that is pivoted at 471 on a bracket 472 secured to channel 418. A solenoid 473 is arranged, when energized, to pivot a latching lever 474 clockwise about a pivot pin 475 against the resistance of a spring (not shown) to align the lower end face of lever 474 with a flat side face of the lever 470. When these faces are aligned, the lever 470 and lever 474 act as a solid member causing the frame 354 to be raised when the high part of cam 460 engages roller 465. A compression spring (not shown) urges the lever 470 downwardly to hold the roller 465 in engagement with cam 460. As seen in FIG. 16 there is a second lifter unit 466A that is identical to unit 466 and is connected to channel 419. Accordingly, the second cam 460, identified as cam 460A is also disposed on shaft 171 and cooperates with a solenoid 473A in unit 466A.

The layer accumulator conveyor LA (FIGS. 18 and 21) comprises a frame support structure which includes two spaced angle bars 490 and 491 that are secured, by bolts, to the upper surfaces of two spaced transverse inverted channels 492 and 493 that are connected between the horizontal box beams 62 and 65. A plurality of rollers 495 are extended between the upstanding walls 490A and 491A of the angle bars 490 and 491, each roller having an inner through-shaft 496, whose hexagonal ends are disposed in slots in the walls 490A and 491A, and an outer tubular member 497. At each end the tubular member has a reduced diameter portion 497A (FIG. 19) in which a bearing assembly is pressed, said bearing having an inner race that receives the hexagonal shaft 496. A sprocket 500 is keyed to the reduced diameter portion at each end of each shaft and a short chain 501 (FIG. 18) is trained around adjacent pairs of sprockets, the chains being so arranged that each of the rollers 495, except the endmost rollers, is connected to an adjacent roller by a chain 501 at one end and is connected to the other adjacent roller by a chain 501 at the other end. With this arrangement, when a drive chain 501A (FIG. 18) which is trained around the sprockets on two of the rollers is actuated, all of the rollers are simultaneously rotated in a clockwise direction to advance a row of cases toward the previously mentioned stop roller 51 which extends across the downstream end of the layer accumulator conveyor LA.

The stop roller 51 is rotatably mounted at its opposite ends in a pair of levers 505 and 506 (FIG. 18), each of which has a hub portion 507 (FIG. 21) pinned to the end of a special, extra long shaft 508 which extends through one of the rollers 495 and its circular in cross-section rather than hexagonal as are the other inner shafts 496 of the rollers 495. Each of the levers 505 and 506 has an arm 510 which underlies a roller 511 that is mounted on a latch lever 512, each latch lever 512 being keyed to a shaft 515 that is rotatably journalled in two spaced bearing members 516 (FIG. 19) and 517 (FIG. 22), each bearing member being mounted in a bracket 518 bolted to the horizontal flange of one of the angle bars 490 and 491. A tension spring 520 (FIGS. 18 and 19) is connected between one of the levers 512 and a bolt 521 projecting from box beam 65 to urge the lever and the shaft 515 in clockwise direction (FIG. 21).

An actuating linkage is connected to lever 506 and includes a link 519 pivoted to the arm 510 of lever 506, a U-shaped levers 523 pivoted to the link 519 and to a bracket 522 (FIG. 22), a pull rod 524 pivoted to the U-shaped lever 523, and a bell crank 525 which is pivoted to the push rod 524 and to a fixed bracket 526. An arm 525A of bellcrank 525 is disposed above a shoulder screw 528 that is secured to a plate 529 carried by the belt carrier frame 354. A second actuating linkage is connected to the latch lever 512 that is adjacent the U-shaped lever 523, said second actuating linkage including a pull rod 532, which is pivoted to a tab 533 carried by lever 512, and to a lever 535 which in turn is pivoted on a fixed bracket 536. A selectively operable cam follower unit 538 which is identical in design to the previously described unit 262 (FIG. 11) but is oriented in a different manner, is bolted to lever 535. The follower unit 538 includes a solenoid 540 which may be energized to swing a lever 541 upwardly to a position wherein the end face of lever 541 is aligned with the side face of a lever 542 on which a follower roller 544 is rotatably mounted. When the solenoid is energized and lever 541 is raised, a cam 548 on camshaft 171 can swing lever 535 counter-clockwise, causing the pull rod 532 to swing the two latch levers 512 counterclockwise and move the rollers 511 on the levers from their position overlying the ends of levers 505 and 506. The stop roller 51 is then free to swing downwardly to the phantom line position of FIG. 21 in driven contact with two rollers 550, which are frictionally driven by the end rollers 495 and, in turn, drive the stop roller 51 when it has moved to its lowered position.

When the stop roller 51 is lowered, the accumulated layer of cases is advanced over the stop roller and onto the layer stripper carriage LSC. When the belt carrier frame 354 of the row diverter conveyor RD is raised to move the next row of cases onto the accumulator conveyor, the shoulder screw 528 will engage bellcrank 525 causing the attached linkage to pivot the levers 505 and 506 counterclockwise and raise the stop roller 51. When the cam follower roller 544 is again in contact with the low part of the cam 548 and the solenoid 540 is de-energized, the tension spring 520 (FIG. 18) will swing the latch lever 512 clockwise (FIG. 21) to the position wherein the rollers 511 on the levers overlie the arms 510 of the levers 505 and 506 and maintain the stop roller 51 in elevated, case-intercepting position.

The layer stripper carriage LSC comprises a plurality of rollers 600 (FIGS. 23 and 25) carried by two spaced chains 601 and 602. Each roller, except the leading rollers 600A and 600B (FIG. 25), includes a tubular outer member 607 having a bearing unit 608 pressed in each end. A pin 609, which is integrally formed as part of a link of the adjacent chain, has an end portion carried by the inner race of the adjacent bearing unit. Accordingly, as each roller is advanced by the chains, it is free to rotate about its axis which of course, coincides with the axis defined by the associated pins 609. Each roller has a cylindrical drive sleeve 610 fixedly secured, as by welding, on each of its ends. The leading roller 600B comprises a center shaft 611 having a recess which receives a pin 612 that is carried by the adjacent chain 601 or 602 and is rotatably mounted in a small ball bearing unit in the end of the roller. A sprocket 613 is keyed to one end portion of the shaft 611, and a roller bearing unit 614 is locked in position on shaft 611 adjacent sprocket 613 by a set collar 615. At the other end of shaft 611, a support roller 616 is held in position by set collars 617 and 618, alongside a spacer 619, that is smaller in diameter than the drive sleeves 610 of the rollers 600. The support roller 616 supports one end of the shaft 611 by its slidable engagement with the upper surface of an angle bar 622 (FIG. 26) which is secured to a vertical wall member 623 of support post 59.

At the entrance end of the layer stripping zone, the chains 601 and 602 are trained around sprockets 626 and 627, respectively (FIG. 23) that are mounted on bearing units 628 and 629. The units 628 and 629 are disposed on a shaft 631 which is rotatably mounted in bearing assemblies 632 and 633 secured to a vertical wall of beam 65 and to a vertical wall of beam 62. At the downstream end of the layer stripping zone, the chains 601 and 602 are trained over sprockets 640 and 641, respectively, both of which are keyed to a shaft 642 that is rotatably journalled in bearings 643 and 644 carried by the vertical wall member 623 and a vertical wall member 645 of the support post 58, respectively. A torsion spring 650 is disposed on a sleeve 651 encircling shaft 642 and has one end 650A anchored in a fixed bracket 648 and the other end anchored in a circular plate 652 (FIG. 25) that is bolted to a plate 653 which is keyed at 654 to shaft 642. The spring is so arranged that it is effective to drive the shaft 642 clockwise (FIG. 24) tending to move the chains 601 and 602, and the rollers carried thereby, to the position indicated in FIG. 24 overlying the load elevator LE.

The rollers 600 of the stripper carriage are rotated by means of two belts 660 and 661 (FIG. 23) which are disposed on opposite sides of the layer stripping zone, the belt 660 being disposed below and in frictional engagement with the drive sleeves 610 at one end of the rollers and belt 661 being in frictional driving engagement with the sleeves 610 at the other end of the rollers. Each of the belts is trained around a pulley 664 (FIG. 25), which is mounted for free rotation on shaft 642, and around a pulley 665 (FIG. 26) that is keyed to shaft 631. As will be explained presently, during the layer stripping operation, the shaft 631 is arranged to be driven in a counter-clockwise direction (FIG. 24) to move the upper run of the belts 660 and 661 in the direction of arrow 666.

The leading roller 600B (FIG. 23) is positively driven by an endless chain 670 that is trained around a sprocket 671 which is keyed to shaft 631 and around a sprocket 672 (FIG. 25) which is keyed to a short shaft 673 journalled in fixedly mounted bearings 674 and 675. A chain 676 is trained around a sprocket 677 on shaft 673 and around a sprocket 678 that is rotatably mounted on shaft 642 and is carried by the drive element 679 of a magnetic clutch 680. This clutch may be of the type that is commercially identified as Fawick Magnetic Clutch SC–550. The driven member 681 of the clutch is keyed to shaft 642. It will be evident that when the shaft 631 is rotated, the chain 670 will rotate the leading roller 600B and, if the magnetic clutch is energized at this time, the shaft 642 will also be driven. A magnetic brake 682 is connected to the shaft 642 by a chain and sprocket drive 683. The brake may be a Fawick Magnetic Brake SB–650 and is arranged to stop rotation of shaft 642 when it is de-energized.

The second roller 600A comprises a center shaft 690 having a roller bearing unit 692, at one end locked in place between set collars 693 and 694 that are secured to shaft 690, and a bearing unit 695 at the other end locked in place between set collars 696 and 697 that are also secured to shaft 690. A plurality of radially extending case-sensing fingers 698 are secured in the roller 600A to project radially outwardly from the surface of the roller. A weight 700 is adjustably mounted on a stud 701 projecting radially from set collar 693, and, at the opposite end of shaft 690, a bent support arm 702 is secured to the set collar 697. A roller 704 is rotatably mounted on the end of support arm 702 overlying an elongate angle plate 706 which extends along practically the entire length of the stripping zone, having a forward end 706A (FIG. 25) adjacent the shaft 642 and a rearward end 706B (FIG. 23) adjacent the shaft 631. The plate 706 is supported on a plurality of studs 710 (FIGS. 23, 25 and 26) which are adjustably secured to the plate and to a tube 712 that is rotatably journalled in mounting arms 713 projecting from a wall of box beam 62. As will be explained further hereinafter when the second roller 600A of the stripper carriage is rotated, due to the engagement of the fingers 698 by the leading row of cases of a layer of cases being advanced onto the stripper carriage by the accumulator conveyor, the roller 704 on bent arm 702 engages the elongate angle plate 706 and pivots it clockwise (FIG. 26) to swing an actuator arm 714 (FIG. 23) which extends radially from the tube 712 into engagement with a switch arm 715 to actuate a switch LS15 that is mounted on a side wall of box beam 62. A spring 716 (FIG. 38) which is connected to the actuator and to a horizontal wall member of beam 62, is stretched as the switch actuator arm 714 is swung upwardly. Subsequently, when the cases are removed from the fingers 698, the spring swings the arm 714 counterclockwise (FIG. 38), causing the plate 706 to raise the roller 704 and the bent support arm 702, whereby the roller 600A is rotated counterclockwise to return the fingers 698 to generally upright, case-intercepting position.

Referring to FIG. 3A, it will be noted that the rollers 600 and 600A are rotated clockwise to bring the layer of cases into contact with a stop bar 711 which is part of a switch mechanism that will be described more fully presently. When the layer of cases has been stopped, continued clockwise rotation of the rollers causes the stripper carriage to walk out from under the cases due to the engagement of the rollers with the undersurfaces of the cases. Accordingly, the cases are dropped, row by row onto the pallet therebelow.

Referring to FIG. 2, it will be noted that two guide bars 717 and 718 are disposed at the forward end of the machine. These bars are close to the upper surface of the layer stripper carriage LSC when the carriage is in its forward position, ready to receive a layer of cases from the layer accumulator LA. The rearward end of each bar is inclined outwardly so that cases entering between the bars will be cammed inwardly and, accordingly, the final width of the layer will correspond to the distance between the bars. With this arrangement, there is no necessity for extreme accuracy in stopping the cases on the row accumulator. For example, the position of the case-intercepting bar that stopped case C12 (FIG. 2) is not critical since, if the gap created between cases C11 and C12 is greater than the desired gap, the guide bars will reduce the gap when they compress the layer as it moves onto the stripper carriage. Another obvious advantage of the guide bars resides in their ability to accurately position the layer above the pallet on which it is to be deposited and, due to the fact that the bars are mounted for adjusting movement toward and away from each other, the size of the layer can be made to conform to several sizes of pallets.

Each guide bar 717 and 718 (FIG. 23) is an inverted relatively shallow channel member that is bolted at its forward end to a transverse angle bar 719. Two spaced blocks 720 and 721 are secured in fixed position on the upper surface of angle bar 719, each block having a semi-cylindrical recess 722 (FIG. 24) in its upper surface. The walls of the recess 722 have ridges and grooves which correspond to the threads in a portion of an internally threaded tube so that, when the blocks 720 and 721 are raised into engagement with a threaded transverse rod 723 certain threads on the rod are received in the grooves on the blocks and the guide bar is thereby locked against movement transversely of the stripper carriage. It will be noted in FIG. 24 that, at a point a short distance rearwardly from its front end, the undersurface of each guide bar 717 and 718 rests on a transverse angle bar 725 which is part of an electrical switch structure to be described hereinafter. The bar 725 acts as a fulcrum whereby the relatively long rearward portion of the guide bar is effective to swing the short forward portion upwardly and thus maintain the locked engagement of the threaded rod 723 and the blocks 720 and 721. The position of each guide bar can be changed by pivoting it clockwise (FIG. 24) about the angle bar 725 to move the blocks out of engagement with the rod 723, and then sliding the guide bar laterally to the desired position.

The load elevator LE (FIG. 24) comprises a rigid frame 730 which includes two spaced transverse angle bars 731 and a pair of spaced longitudinal bars 732 (FIG. 27) all welded together to form a rigid member on the upper surface of which two spaced longitudinal angle bars 733 and 734 are bolted. A plurality of rollers 736 are mounted in and extend between said bars 733 and 734, to form a table T said rollers being substantially identical to the rollers 495 of the layer accumulator conveyor LA since they have hexagonal inner shafts 737 (FIG. 24), tubular outer shafts 738, and short sprocket and chain drive units 739 at the ends of the shafts so that all shafts are simultaneously driven in the same direction of rotation. One of the rollers, indicated by reference numeral 736A in FIG. 24, is driven through a sprocket and chain drive 740 by a motor M3 that is mounted in the frame 730.

The leading roller 736B is not mounted directly on the angle bars 733 and 734 but is pivotally mounted thereon by two levers 744 and 745 (FIG. 26), each lever being pivotally secured to the adjacent angle bar by the hexagonal inner shaft of the roller 736 next behind the roller 736B. When no load is on the roller table as when the table is being elevated after having discharged a loaded pallet, springs 747 (FIGS. 24 and 26) which are connected between fixed stud bolts 748 and the ends of levers 744 and 745 pivot the levers counterclockwise until the ends of the levers abut fixed stops 749 and the roller 736B is in an elevated position. When the table is raised to a position to receive an unloaded pallet from the pallet stripper carriage PSC, a pallet is moved onto the table T and comes into contact with the raised roller 736B. The levers 744 and 745 are pivoted clockwise to the position shown in FIG. 24 wherein the lower ends of the levers abut latch levers 751 that are pivotally mounted on the angle bars 733 and 734 and are urged by gravity to a position wherein they engage the horizontal flanges of angle bars 733 and 734. Accordingly, while the pallet is being loaded and lowered step by step, the stop roller 736B is latched in the position shown in FIG. 24. When the pallet is loaded and is ready to be discharged from the machine, the elevator is moved to its lowermost position, causing bolts 754 to project through openings 755 (one only being shown) in the angle bars 733 and 734 and engage the latch levers 751. The latch levers are thus pivoted clockwise to release the levers 744 and 745. Then when the motor 741 is energized and the rollers 736 are driven the stop roller 736B will be swung down to a position wherein it forms a continuation of the roller table and permits the loaded pallet to be discharged from the machine.

The frame 730 and the roller table mounted thereon are raised and lowered by means of a lifting mechanism 759 which includes a motor M2 that is mounted in the vertical post 58. The power shaft of the motor is coupled to a vertical threaded shaft 761 which is journalled for rotation in spaced bearings 762 and 763. A magnetic brake 760, which may be of the same type as brake 682, is suitably mounted in the machine and adapted to stop rotation of shaft 761 when it is de-energized. An internally threaded block 765 is disposed on the threaded shaft 761, and two chains 766 and 767 are secured to the block by bolts 768 (FIG. 26). Each of the chains is trained around sprocket a 770 keyed to a shaft 771 which extends across the end of the machine and is journalled for rotation in bearings 772, 773 and 774 secured to vertical post 58 and to the vertical post 59. Four sprockets 775, 776, 777 and 778 are keyed to shaft 771. A chain 780 is secured to one corner of the forward end of the table by a special bolt 781 (FIG. 26) and extends upwardly around the sprocket 776 and has a counterweight 779 secured to its end. Similarly, a chain 782 is connected to the other forward corner of the table, is trained around sprocket 777, and has a counterweight 783 secured to its end. A chain 784 (FIG. 24) is secured to one rear corner of the table and is trained around a sprocket 785 which is mounted on a short shaft 786 that is journalled in bearings (not shown) in the walls of box beam 65. The chain 784 extends forwardly from the sprocket 785, is trained around sprocket 778, and is connected to the counterweight 783. Similarly, a chain 789 (FIG. 23) is connected to the other rear corner of the table and is trained over a sprocket 787 that is keyed to a short shaft 788 journalled for rotation in bearings in the opposite walls of box beam 62. The chain 789 extends forwardly from the sprocket 787, is trained around sprocket 775, and is connected to the counterweight 779.

It will be evident that, when the motor M2 is operating, the block 765 will move up or down the shaft 761 and through the shaft 771 and the sprockets and chains associated with the shaft will raise or lower the table.

As previously mentioned, after a loaded pallet has been discharged from the machine, the table is raised to a predetermined position to receive an empty pallet from the pallet storage magazine. It is desirable that this empty pallet is centered directly under the layer of cases being positioned on the layer stripper carriage so that when the layer is dropped onto the pallet it will be properly centered thereon and so that the positioning of additional layers on the pallet will not cause an unstable load condition. To properly position the empty pallet on the table, two guide bars 800 and 801 (FIG. 27) are provided. Each bar has a slanted guide portion 802 and a portion 803 that is substantially parallel to the longitudinal centerline of the table. The distance between the opposed portion 803 should, of course, be coordinated with the width of the pallet being used so that proper centering of the pallet will take place.

Each guide bar has a rearward end 804 (FIG. 29) welded to an upstanding float lever 805 which has a short inverted channel member 806 welded to one face and a locking block 807 bolted to its opposite face near its lower end. The channel 806 is disposed over a tubular bar 810 which is mounted in fixed position on the rear end of the table support frame 730. The locking block 807 has a semicylindrical recess 811 in which ridges and grooves are formed corresponding to the threads on a portion of an internally threaded tube so that, when the block 807 is moved into engagement with a threaded transverse rod 813 that is secured between spaced arms 814 of the frame 730, the threads on the rod 813 will be engaged in the ridges and grooves of the block, and the guide bar will be locked against lateral movement relative to the table. To unlock the guide bar, it is pivoted counterclockwise (FIG. 29) to disengage the block 807 from the threaded rod 813. The guide bar can then be adjusted toward or away from the centerline of the table. It will be evident that, since the guide bars 717 and 718 above the layer stripper and the guide bars 800 and 801 are all adjustable relative to the longitudinal centerline of the stripper carriage, the position of the layer of cases being formed and the position of the pallet onto which it is to be transferred can be effectively coordinated.

The pallet elevator PE, which supports a supply of empty pallets in the storage chamber 55, comprises a support base 825 made up of two parallel rigid tubes 826 and 827 (FIG. 31) which, at one end, extend through and are welded to a box-like beam 828. An angle plate 830 is welded to the free end of each tube 826 and 827. Two identical lifting and pallet-support arms 831 and 832 (FIG. 31) are bolted to the box beam 828.

The pallet elevator is raised and lowered by a mechanism 835 that is substantially identical to the lifting mechanism 759 which has been described in connection with the load elevator LE and, accordingly a detailed description of the lifting mechanism will not be necessary. In general, the mechanism includes a motor M4 that is mounted in the vertical post 56 and is coupled to a vertical rotatable shaft 836 which has a magnetic brake 834 operatively connected thereto. A nut or block 837 on the shaft 836 drives a horizontal rotatable shaft 840 through a chain and sprocket drive mechanism 841, including two spaced sprocket and chain units 842 and 843. A pair of lifting chains 845 and 846 (FIG. 30) are trained around sprockets 847 and 848, respectively, that are keyed to shaft 840. The chain 845 is relatively short and is secured to one rear corner of the elevator base 825 while the chain 846 is longer and extends forwardly, is trained over a sprocket 849 that is disposed on a short shaft 850 that is rotatably mounted in the box beam 62, and is conncted to one of the forward corners of the base 825. Similarly, as seen in FIG. 2, a short chain 851 and a long chain 852 are trained over sprockets 853 and 854 that are keyed to a shaft 855 that is rotatably supported in the vertical post 61. The short chain is secured to the other rear corner of the elevator base and the long chain 852 is extended forwardly, is trained over a sprocket 856 keyed to a rotatable shaft 857, and is connected to the other forward corner of the base. It will thus be apparent that actuation of the motor M4 causes raising and lowering of the pallet elevator PE.

When the pallet elevator is in its lowermost position, the lifting arms 831 and 832 are disposed between the upper runs of two endless chains of a conveyor 833 (FIG. 3) and at a lower elevation than the upper conveying surfaces of said chains. Accordingly, if the pallet storage chamber is empty and the elevator PE is in its lowermost position, a stack of superposed, empty pallets can be transported into the chamber by the conveyor 833 to a position above the lifting arms. Then, when the pallet elevator is subsequently actuated, the uppermost pallet in the stack will be raised to the position indicated by pallet P1 in FIG. 3. In this position, pallet P1 is in the path of movement of the pallet stripper carriage PSC. When the load elevator LE is empty and is being raised to a position opposite pallet P1, the upper end of the stripper carriage moves to the left to grip the side edge of the pallet, raise the pallet, and move under the pallet while the pallet is advanced forwardly toward the awaiting load elevator.

The pallet stripper carriage PSC is substantially identical to the layer stripper carriage LSC in construction being made up of a plurality of rollers 860 (FIG. 31) having drive sleeves 861 secured, as by welding, to each end, and having bearing units 862 pressed in each end to receive pins 863 projecting from two chains 864 and 865. The leading roller 860A has a fluted sleeve 866 secured thereto, said sleeve being made of rubber or of any material that will effectively grip the side surface of the pallet. If wooden pallets are used, a leading roller that has short metal projections may be used. At one end, the leading roller 860A has a sprocket 867 keyed thereto and a roller bearing 868 locked thereon between the sprocket and a set collar 869.

All of the carriage rollers 860, except the leading roller 860A, are driven by two belts 870 and 871, each of which underlies an end of the rollers and frictionally engages the drive sleeves 861 secured thereto. Each belt is trained around a pulley 872 that is keyed to the previously-mentioned power driven shaft 202 which extends longitudinally below the frame 85 and is rotatably mounted in bearings 873 and 874. Each belt is also trained over a pulley 875 that is rotatably mounted on a shaft 876 which, in turn, is rotatably mounted in bearings 877 and 878. The sprocket 867 on the leading roller 860A is driven by a chain 879 that is disposed on a sprocket 880 which is keyed to shaft 202 and on a sprocket 881 that is rotatably mounted on shaft 876. It will be evident that, when the power driven shaft 202 is rotated, the belts 870 and 871 rotate the rollers 860 and the chain 879 rotates the leading roller 860A.

Each of the chains 864 and 865, on which the rollers 860 and 860A are carried, is trained over a sprocket 885 keyed to a rotatable shaft 886 and over a sprocket 888 keyed to the shaft 876. A torsion spring 890 is disposed over a sleeve 891 that encircles the shaft 886, said spring having one end secured by a capscrew 892 to one of the sprockets 885 and an opposite end anchored in a fixed bracket 894. Referring to FIGS. 3, 27 and 29, it will be noted that a bar 895 is secured between the ends of the two chains 864 and 865 and that the arms 814 of the frame 730 of the layer elevator overlie the bar 895. Accordingly, as the elevator is progressively lowered, the stripper carriage is moved to the retracted position of FIG. 3, against the resistance of torsion spring 890. After the loaded pallet has been discharged, the elevator is raised, permitting the torsion spring to move the pallet stripper carriage upwardly and moving the leading roller 860A into contact with the side face of the uppermost pallet on the pallet elevator.

As indicated diagrammatically in FIGS. 3B and 3C, when the torsion spring draws the stripper carriage upwardly and forwardly, the rollers 860 and 860A are being rotated clockwise by the associated belts. A pallet restraining angle bar 893 (FIG. 30) is pivotally mounted at 893A in the upper end of the pallet storage magazine at each side thereof. The bar has a plurality of latch arms 896 pivotally mounted thereon so that they assume the depending position indicated in FIG. 3D with their upper edges 896A engaging the undersulface of the flange of the angle bar. When the pallets are raised in the magazine, the uppermost pallet engages the latches, and folds certain latches upwardly; however, at least one latch arm 896 will be disposed rearwardly of the pallet. Then, when the stripper carriage engages the pallet to strip it, the latch arm behind the stripper prevents it from moving away from the stripper as seen in FIG. 3C. Accordingly, the leading rollers grips the edge of the pallet P, raises it and passes thereunder. As the rollers move under the pallet, the pallet is conveyed rearwardly toward the awaiting roller table T on the load elevator LE.

The drive mechanism for the machine includes six motors M1, M2, M3, M4, M5 and M6. As previously mentioned motor M2 (FIG. 24) is arranged to rotate the shaft 761 to raise of lower the load elevator LE. As seen in FIG. 30, the motor M4 is arranged to rotate the shaft 836 to raise and lower the pallet elevator PE and the motor M5 is arranged to drive the endless chain pallet feed conveyor 833. The remainder of the drive mechanism of the machine is shown diagrammatically in FIG. 32 wherein it will be seen that the shaft 202, which drives the input shaft 201 of gear box 199 through chain 203, is driven by motor M1 through a belt and pulley drive 897 and a sprocket and chain drive 898. As previously mentioned, the chain 203 also drives the drive member of a one-revolution clutch 173 while the gear box 199 has shafts for causing the reciprocation of the push rod 190 of the case pusher CP and for rotating the shaft 97 which, in turn, drives the belts 90 and 91. When the clutch 173 is actuated the camshaft 171 is rotated through a single revolution, causing a single revolution of cam 170 which controls the raising and lowering of the conveyor feed belts 100, of cam 264 which is effective at certain times to raise one set of rollers of the case turner CT, of the two cams 460 and 460A which control the raising and lowering of the row diverter belts 415, of cam 396 which controls the raising and lowering of the gap-forming stop bar 300A to obtain a gap between cases on the row accumulator, of cam 548 which controls the layer discharge roller 51, and of a timing cam 899 which actuates two switches MT-1 and MT-2 that are part of the electrical control circuit. Also, the camshaft 171 rotates a shaft 900 which drives a program chain that is also part of the electrical control circuit to be described presently. The camshaft 171 drives the program shaft 900 through a gear mechanism 901 and accordingly one revolution of camshaft 171 causes only a part of a revolution of the program shaft.

The motor M1 also drives shaft 436 which actuates the belts 415 of the row diverter RD to move an assembled row of cases from the row accumulator RA to the layer accumulator. The motor M1 is a Sterling Gear Motor having one output shaft 905 rotatable counterclockwise and a second output shaft 904 rotatable clockwise which drives shaft 436. The shaft 905 also drives the shaft 631, which actuates the belts 660 and 661 and chain 670 that rotate the rollers 600 of the layer stripper carriage LSC, the shaft 905 being connected to shaft 631 by means of the belt and pulley drive 897, a chain 906 connecting shafts 907 and 908, and a chain 910 connecting shaft 908 with shafts 631 and 911. Shaft 911 carries a sprocket 912 around which the chain 501A that drives the rollers 495 of the accumulator conveyor is trained. As previously mentioned, the motor M1 is connected to the shaft 202 which drives the belts 870 and 871 and the chain 879 of the pallet stripper carriage PSC by belt drive 897 and chain drive 898. It will therefore be evident that, when the motor M1 is energized, the rollers of the layer stripper carriage ISC and those of the pallet stripper carriage PSC will immediately start to rotate, as will the rollers 80 of the case diverter conveyor, the rollers 222 of the case turner conveyor, the rollers 300 of the row accumulator conveyor, and the rollers 495 of the layer accumulator conveyor.

Motor M6 (FIG. 32) drives the feed conveyor drive shaft 73 through a chain and sprocket mechanism 915, and shaft 73 in turn drives shaft 105, to which the drive pulleys of the V-belts 100 are keyed, by means of the chain and sprocket drive 163.

The electrical control circuit includes a plurality of limit switches that are located at particular areas of the machine to control certain operations. A switch LS-1 (FIG. 33) is mounted on a vertical bar 918 which is secured to a wall of the post 60 and is held in spaced relation to the wall by spacers 919 (one only being shown in FIG. 34). A rod 920 is slidably held in two spaced clamps 921 (FIG. 33), each of which is secured to the mounting bar 918 and has two plates 922 that frictionally grip the rod 920. A switch actuator 923 is secured to the bar 918 intermediate its ends and collars 924 and 925 are adjustably secured to opposite ends of the rod 920 in the path of movement of a plate 926 that is mounted on the arm 814 of the load elevator frame 730 that is adjacent column 60. The plate 926 has an arcuate recess 927 which is large enough to receive the rod 920 and the clamp plates 922 but not large enough to permit passage of either of the collars 924 or 925. Accordingly, during upward movement of the load elevator, the plate moves upwardly until it contacts and raises collar 924, causing switch actuator 923 to engage an arm 929 of switch LS–1. As the actuator continues upward, arm 929 is raised to a vertical position while an arm 930 is moved to a laterally projecting position. When the elevator is subsequently lowered, the plate 926 engages the lower collar 925, pulling the rod 920 downwardly and causing switch actuator 923 to engage switch arm 930 and swing it downwardly, returning arm 929 to its laterally projecting position.

A switch LS–2 is also mounted on vertical bar 918 and has an arm 932 in the path of vertical movement of a portion 933 of the plate 926. Accordingly, each time the load elevator LE is raised, the plate actuates switch LS–2. The switch LS–2 is of the type that is only actuated when the arm 932 is swung upwardly and therefore it is not actuated when the elevator descends.

A switch LS–14 is mounted on vertical bar 918 and has an arm 934 that is arranged to be engaged and actuated by the plate 926 when the load elevator is in its lowered position. The switch LS–14 is normally open and is only closed when contacted by plate 926.

A switch LS–12, which is adjustably mounted on bar 918, by a releasable clamp 937, is provided with two arms 935 and 936. During upward movement of the load elevator, a tab 938 that projects laterally from one of the arms 814 of the elevator frame contacts arm 935 and actuates the switch. As the elevator descends, the tab engages arm 936 and swings arm 935 to its original position.

A switch LS–5 is mounted on a vertical bar 940 which is secured to a wall of post 61 (FIG. 35) in spaced relation thereto by capscrews 941 and spacers (not shown). A rod 942 is slidably supported in friction clamps 943 and 944 that are secured to the bar 940. A switch actuator 945 is secured to the rod 942 intermediate its ends, and two collars 946 and 947 are adjustably secured to opposite ends of the rod in the path of vertical movement of an actuator plate 948 that is secured to the angle 830 carried on the pallet elevator frame adjacent post 61. The plate 948 has an arcuate recess that is large enough to receive the rod 942 but not large enough to permit passage of either of the collars 946 or 947. Accordingly, during upward movement of the pallet elevator, the plate moves upwardly until it contacts and raises collar 946, causing switch actuator 945 to engage an arm 950 of switch LS–5. As the actuator continues upwardly arm 950 is moved to a vertical position and an arm 951 is moved to a laterally projecting position. When the pallet elevator is lowered, the plate 948 engages collar 947, pulling rod 942 downwardly and causing switch actuator 945 to engage switch arm 951 and swing it downwardly, returning arm 950 to its original laterally projecting position.

A switch LS–4 is also mounted on vertical bar 940 and has an arm 955 that is arranged to be engaged and actuated by the plate 948 when the pallet elevator is in its lowered position. This switch LS–4 is normally open and is closed only when contacted by plate 948.

Referring to FIG. 30, a switch LS–6 is mounted on a panel 960 that extends transversely across the machine between the pallet elevator and the load elevator. When a stack of empty pallets is carried into the machine on the endless chain conveyor 833 that is driven by the motor M5, the forward edge of the stack engages a switch actuator 962, causing the actuator to pivot about pin 963 and move a contact plate 964 away from an arm 965 of switch LS–6. When the pallet elevator has been raised to a point where the pallets pass out of engagement with actuator 962, a spring 967 returns the plate 964 into engagement with the switch arm 965.

A switch LS–7 (FIG. 30) is mounted on a side wall of the beam 65 at the upper end of the pallet magazine 66 and has a curved actuator paddle 968 disposed centrally by the magazine in a position to be engaged by the uppermost pallet of a stack of pallets on the pallet elevator. The paddle is connected by a short plate 969 to a shaft 970 that is rotatably mounted on tabs (not shown) projecting inwardly from one wall of an inverted transverse channel 971. An arm 972 is keyed to shaft 970 and is arranged to engage a button 973 on arm 974 that is secured to a shaft 975 extending toward the side wall of the beam 65. At its end the shaft 975 carries a disc 976 that has a recess receiving the end of a switch actuator arm 977. Accordingly, when the paddle 968 is raised, the disc 976 is rotated to actuate switch LS–7, opening the normally closed contacts of the switch. When the top pallet is removed from the stack, switch LS–7 is permitted to close again.

A switch LS–11 (FIG. 30) is mounted on a wall of box beam 62 and has a spring-loaded actuator arm 978 overlying the path of movement of the leading roller 860A of the pallet stripper carriage PSC. When the arm 978 is contacted by roller 860A, it is rotated clockwise causing a rotary actuator 979 to rotate clockwise and actuate an arm 977 of the switch LS–11. When the carriage is retracted, a torsion spring (not shown) returns the actuator arm 978 to its roller-intercepting position.

A switch LS–10 (FIG. 23) is mounted at the forward end of the machine adjacent the forward end of the case guide bar 718. The actuator of this switch is the stop bar 711 which extends across the forward end of the machine in position to be engaged by the leading cases of a layer of case received from the layer accumulator. The bar 711 is mounted between two identical levers 982 and 983 (FIGS. 26 and 37) which are pivotally mounted on two spaced vertical plates 978. The vertical plates are secured to opposite ends of the angle bar 725 so that the two plates and the bar form a carriage on which the actuator bar is pivotally mounted. A switch contact member 984 is adjustably mounted on one arm of the lever 982 in position to engage an arm 985 of the switch LS–10. A channel 980 is welded to the outer surface of each plate 978, and two rollers 981 are rotatably mounted on each channel and adapted to roll along a track defined between two fixed spaced plates 987. A pair of vertically aligned apertures 980A are provided in each channel 980 and, by rolling the carriage along the guide track, apertures 980A can be aligned with one pair of a plurality of pairs of aligned apertures 987A in the spaced plates 987. At each side of the machine, a pin 988 is adapted to be inserted in the four aligned apertures to lock the carriage in fixed position. The provision of this adjustable stop bar makes it possible to position the forward edge of the layer of cases at a desired location relative to the forward and rearward edge of the pallet on which the layer is to be discharged. Obviously, the edge of the layer can be made to coincide with the edge of the pallet. Or, when the layer is not as long as the pallet, the layer can be centered on the pallet. When the advancing layer of cases engages bar 711, it swings lever 982 counterclockwise causing contact member 984 to actuate an arm 985 of switch LS–10 and close the contacts of the switch. When the layer of cases is dropped from the stripper carriage, it remains in contact with switch actuator bar 711 until the table is lowered. When the bar 711 is released by the cases, a spring 986 swings lever 982 clockwise, releasing switch arm 985, permitting the contacts of LS–10 to open.

A switch LS–8 (FIG. 39) is mounted on the inside face of the angle bar 733 of the load elevator table and has a rotary actuator member 989 which projects through an opening in the bar 733 and has a U-shaped clip 990 secured thereto. A button 991 secured to the lever 744 projects into the clip 990. When a loaded pallet is being discharged from the machine, the leading roller 736B is in the position shown in phantom lines. After the load has been discharged, the spring 747 swings arm 744 counterclockwise, causing the button to engage arm 990A of clip 990 and rotate the actuator 989 clockwise to open a set of normally closed contacts and close a set of normally open contacts. When the table has been raised to the position opposite the pallet stripper carriage and a pallet is moved onto the table, the pallet engages roller 736B and swings it clockwise, causing the button to engage 990B of clip 990. The rotary actuator 989 is thus rotated counterclockwise to close the normally closed contacts and open the normally open contacts.

A switch LS–13 (FIG. 23) is mounted at the forward end of the layer stripper zone just above the path of forward movement of the layer stripper carriage. This switch has an actuator 992 (FIG. 37) that extends downwardly into position to be engaged by the leading roller 600B of the stripper carriage. When the roller 600B engages and moves the actuator 992, normally closed contacts of the switch are opened.

As previously mentioned, switch LS–15 is mounted on a side wall of box beam 62 and is arranged to be actuated in response to a row of cases engaging the fingers 698 (FIG. 38) on the roller 600A of the layer stripper carriage. When cases are moved into engagement with the fingers, roller 600A is rotated clockwise, causing roller 704 to rotate tube 712 clockwise and swing switch actuator 714 upwardly to actuate the switch. As a result, a set of normal closed contacts are opened and a set of normally open contacts are closed. When the last row of cases is stripped from the carriage, the spring 716 pulls the actuator 714 downwardly, returning the contacts of the switch to their original position and rotating the carrigae roller 600A to its original position.

A safety switch LS–16 (FIG. 24) which may be adjustably mounted adjacent the rear end of the stripping zone, has an actuator 993 arranged to be engaged by the bent arm 702 carried by the carriage roller 600A. This switch is so located that it will not be actuated as long as layers of normal size are being formed and discharged by the stripper carriage. However, if a layer is extra long, the bent arm 702 will actuate the switch LS–16 and stop the entire machine before the stripper carriage travels too far rearwardly.

Referring to FIG. 32, it will be seen that, when the camshaft 171 is rotated through one revolution, the case turning control cam 264, the gap forming case stop cam 396, the row diverter cams 460, and the accumulator stop roller control cam 548 are each rotated one complete revolution. However, as previously mentioned, these cams cannot carry out their control function unless associated solenoids are energized. In the present machine, a program chain 1000 (FIG. 40) controls the operation of the solenoids. The chain is an endless member comprising a plurality of connector links 1001 (FIG. 41) which have a yoke portion defined by arms 1002 and 1003, and a third arm 1004 that extends away from arms 1002 and 1003. The third arm 1004 of one link is disposed between the arms 1002 and 1003 of an adjacent link, and aligned holes in all three arms receive a mounting or case control rod 1005 which has two portions 1005A and 1005B projecting equal distances on opposite sides of the links 1001. Twelve rollers R1–R12 are mounted on each rod and, accordingly, the rollers define columns on the chain, i.e. all rollers R1 define a first column and rollers R2 define a second column. O-rings 1006 of rubber or suitable synthetic material lock the twelve rollers on the rod. Rollers R1, R6, R7 and R12 are identical cylindrical rollers and are adapted to fit between adjacent teeth of four sprockets 1007 that are secured to the program chain shaft 900, so that rotation of the shaft 900 will cause the chain to be moved relative to eight switches P1–P8 that are secured to a mounting member 1008 in alignment with the columns defined by rollers R2–R5 and R8–R11 respectively. The mounting member has a hooked end portion 1009 disposed around a rod 1010 that is carried in a support structure 1011 secured to a side plate of the machine. A clamping bar (not shown) is anchored in the structure 1011 and overlies the mounting member 1008. When the program chain is to be replaced, the clamping bar is swung aside, the member 1008 pivoted upwardly, and the chain lifted off the sprockets. The gear mechanism that drives shaft 900 is such that for each revolution of camshaft 171, the chain is moved relative to the switches a distance equal to the distance between adjacent rods of the chain.

The switches, which are shown only diagrammatically in FIG. 40, may be sub-miniature switches of the type known as Licon 16–404. The mounting for the switches and the program chain are disclosed in detail in the application of Ernest A. Verrinder and Francis Curtis, filed of even date herewith and reference may be had to said application for details of construction and operation that are not specifically mentioned herein.

In FIG. 41, a rod is shown having rollers R3, R5 and R8–R11 that are identical to roller R1 while rollers R2 and R4 are of enlarged diameter. The size of the rollers is so chosen that only the large rollers R2 and R4 will actuate the associated switches when they are moved to a position thereunder. In a control operation to be explained presently only four solenoids are to be actuated and these solenoids are associated with switches P1–P4. Accordingly, there is no need for actuating switches P5–P8 and therefore all rollers R8–R11 on all mounting rod portions 1005B will be small diameter rollers that cannot actuate switches. It will be understood, however, that any of the rollers R2–R5 and R8–R11 may be large diameter rollers if desired.

In the chart shown in FIG. 43, a control sequence is illustrated for the layer of cases formed as indicated in FIG. 44. It should be noted that this layer is not square but is rectangular and accordingly, the bar 711 at the forward end of the stripper zone may have to be adjusted to center this load on a square pallet. In the chart of FIG. 43 the mounting rod 1005 that corresponds to each case is listed down the side of the chart and a letter X is placed opposite the rod for each large switch-actuating roller placed on that rod. For example, the first line, indicated that rollers R2 and R3 on the mounting rod associated with the first case in the layer are large rollers adapted to actuate switches P1 and P2. It will be understood that, at the beginning of a pattern-forming cycle, the rod corresponding to case No. 1 will be at the "home" position, indicated in FIG. 40A, with the large rollers on the rod engaging and holding closed the associated switches. Then, when the first case enters the machine and trips switch LS–A to cause rotation of the camshaft 171 and movement of the program chain in the direction of arrow A (FIG. 40A), the switches remain closed for about 240° of camshaft rotation and then they are allowed to open. At about 350° of camshaft rotation, the large rollers associated with the next case close the switches. Referring to the control diagram of FIG. 46, it will also be noted that, when switch LS–A is closed by an incoming case, circuits are closed through whichever ones of the switches P1–P4 is held closed at that time, and the case will hold switch LS–A closed for more than 30° of camshaft rotation until timing switch MT–1 closes to keep the circuits energized. At 180° of camshaft rotation, the timing switch MT–1 opens to open the circuits. It will of course be obvious that the control operation that depends on the closing of any of the switches P1–P4 must be accomplished while the timing cam 899 keeps the circuits closed. Further, it will be evident that the circuits are broken by means of the switch MT–1 rather than by opening the contacts of the miniature snap-action switches P1–P4. In FIG. 46, diagrammatic sketches of the camshaft 171 are shown adjacent the switches P1–P5, MT–1 and MT–2, each sketch indicating by a cross-hatched area, the "open" period of the associated switch.

The formation of a layer of cases will be described with reference to the chart of FIG. 43. It should be noted that switch P1 which is arranged to be actuated by roller R2 is in a circuit with the solenoid 277 that controls the case turner, the switch P2 is connected to the solenoid 473 that controls the row diverter, the switch P3 is connected to the solenoid 540 that controls the discharge of layers from the layer accumulator, and switch P4 is connected to the solenoid 390 that controls the gap forming case stop which forms gaps in the case row.

When case #1 closes switch LS–A, the case turner solenoid and the row discharge solenoid are energized. Then, as the case moved over the case turner CT, the cam 264 will raise the roller section 221 upwardly against the associated brake to cause the case to be rotated 90°. Since there is no row on the row accumulator, the raising of the belts 415 performs no operation at the start of a layer forming operation. When case #2 actuates switch LS–A, the case turned solenoid and the layer discharge solenoid are energized. As a result case #2 is rotated 90° when it passes over the case turner, and the stop roller 51 of the accumulator is lowered. Since no previously formed layer is on the accumulator, the lowering of roller 51 has no function at this time. When case #3 actuates switch LS–A, the case turner solenoid will be energized and case #3 will be turned 90°. There will now be a row of three cases formed on the row accumulator.

Case #4 activates the case turner and the row discharge mechanism. Accordingly, the row made up of cases #1–#3 is discharged onto the layer accumulator, as case #4 is turned 90° and moves to a position against stop roller 50 of the row accumulator. Cases #5 and #6 also activate the case turner and are turned 90° and positioned adjacent case #4 on the row accumulator to form a second row. Case #7 actuates only the row discharge mechanism and, therefore, the second row of cases is discharged onto the layer accumulator as the unturned case #7 moves toward the stop roller 50. Case #8 does not actuate any solenoids and keeps its original orientation as it moves to position alongside case #7. Case #9 actuates the solenoid associated with the gap-forming roller 300A and the roller is raised in front of case #9 to stop it in spaced relation to case #8. Case #10 does not actuate any switches and therefore it moves to a position adjacent case #9 to complete the third row of cases.

If a locked load of layers of cases is to be formed, the orientation of the cases of the second layer should be different from that of the cases of the first layer. One such second layer comprising cases #11–#20 is illustrated in FIG. 45, and the program control rod settings for cases #11–#20 are shown in the chart of FIG. 43. It should be noted that case #11 causes the discharge of the third row of the first layer and that case #12 causes the discharge of the layer from the accumulator conveyor. Also, in the second layer, the gap is formed between cases #12 and #13 and therefore case #13 raises the gap forming stop bar 300A. The remainder of the control operations of cases #11–#20 will be evident from a study of the chart. Also, from the previous discussion, it should be evident how subsequent layers are formed and discharged. It should be noted that the first case in each row should actuate the row discharge solenoid to clear a previously formed row from the row accumulator, and the second case in the first row of each layer should actuate the layer discharge solenoid. The chain can be made as long as is necessary to form a complete load of interlocked layers. A load of suitable stability may be obtained if the previously described first and second layers are alternated to form the entire load. However, if it is desirable to locate the gaps at different locations or to rearrange the cases to form differently arranged layers, the suitable large rollers can be quickly installed on the program chain. It is of course desirable that the chain has a suitable number of control rods 1005 such that when a complete load has been formed, the chain is stopped at a position in which the control rod corresponding to the first case of the next load is in the "home" position.

A manually operated switch HS is shown in FIG. 46 in a circuit with a relay UR. When this switch is closed, a relay contact UR–1 in the circuit of the second timing switch MT–2 is closed. Switch MT–2 is always closed when the camshaft 171 stops rotating. Accordingly, if the program chain is not at "home" position and no more cases are coming into the machine, the manual closing of switch HS will cause the repeated actuation of the one-revolution clutch 173 whereby the program chain will be progressively moved to "home" position. When "home" position is reached, a large roller (not shown) which may be on an extension of the control rod 1005 of the first case of the first layer, opens switch P5 to prevent further energization of the clutch through MT–2.

The electrical system which controls the operation of the pallet elevator, the load elevator, the pallet feed conveyor, and the case feed conveyor is separate from the program chain circuit. A cycle of operation of these mechanisms, starting with the operations that take place after a completed layer of cases is moved from the layer accumulator conveyor onto the layer stripper carriage will be described in connection with FIG. 3 and with the control diagram of FIG. 47 wherein M1 is the main drive motor, M6 is the motor driving the case feed conveyor, M2–D indicates the windings of motor M2 that drive the load elevator LE down, M2–U indicates the windings of motor M2 that cause the load elevator to be elevated, M3 is the drive motor for the table rollers 736, M4–U indicates the windings of motor M4 that cause the pallet elevator PE to raise, M4–D is the windings that cause the pallet elevator to lower, and M5 indicates the motor that drives the pallet feed conveyor 833.

At the start of this cycle the load table T will be considered to be in its uppermost position supporting a pallet directly beneath the layer stripper carriage which is holding the contacts of switch LS–13 open. When start switch SW–1 is closed the main motor M1 is energized through a circuit connected between lines L1–L2 which supply 115 volt A.C. current. An interlock M1–1 in circuit 2 keeps M1 energized. When motor M1 is energized the rollers 600 of the layer stripper carriage will be rotated clockwise (FIG. 3), the rollers 495 of the layer accumulator conveyor LA will be rotated clockwise, and the rollers 860 of the pallet stripper carriage PSC will be rotated clockwise. When the stop roller 51 of the layer accumulator is lowered and the layer of cases is advanced over the layer stripper carriage, the leading cases engage the actuator 711 of switch LS–10, opening contacts LS–10A in circuit 4 and closing contacts LS–10B in circuit 6. Also, the cases engage the radial fingers on the second roller 600A, causing LS–15 to be actuated, causing contacts LS–15A in circuit 6 to open and contacts LS–15B in circuit 8 to close, energizing relay C. When relay C is energized, contacts C–1 in circuit 22 close and the load stripper carriage brake 682 is energized, since normally open contact B–1 is closed due to the fact that relay B in circuit 4 is energized through contact LS–12A, contact LS–1A in circuit 6 having been closed by the load table when it reached its upper position. Therefore, the brake 682 is released and the clutch 680 through contact C–2 is energized to drive the layer stripper carriage rearwardly.

As the layer stripper retracts, the layer of cases moves off the rollers causing switch LS–15 to be released, whereby contact LS–15A in circuit 6 closes and contact LS–15B in circuit 8 is opened to de-energize relay C. Contact C–2 in circuit 23 opens to de-energize the clutch 680 and permit the torsion spring on the layer stripper carriage to move the stripper toward the front of the machine. The brake 682 remains energized, allowing the shaft 642 to continue rotating, due to the fact that switch LS–13 in circuit 21 was allowed to close as the stripper was retracted.

Since contacts LS–15A in circuit 6 are now closed, contacts LS–10B are still held closed by the layer of cases, and contacts LS–1A were closed during upward movement of the load elevator, motor windings M2–D are energized to start the elevator down.

As the elevator moves down, the cases release the actuator of switch LS–10, closing contacts LS–10A in circuit 4 and opening contacts LS–10B in circuit 6 to de-energize M2–D. The torsion spring then returns the stripper carriage to its position above the load elevator, the leading roller of the carriage contacting and opening switch LS–13 (circuit 21) to de-energize the brake and cause it to hold shaft 642 against rotation. Then the next layer of cases comes in and the layer discharging and elevator lowering operations are repeated.

When a predetermined number of layers are on the table, the tab 938 on the elevator engages LS–12 closing contacts LS–12B in circuit 7. The motor windings M2–D are then energized through contacts LS–1A, LS–12B, and LS–15A which are closed when the stripper is retracted, and the load elevator is lowered all the way to the bottom, since the contacts LS–10B in circuit 6, which are opened when the cases pass out of contact with LS–10, are bypassed. As the elevator reaches its lowered position, contacts LS–1A in circuit 6 are opened, de-energizing M2–D. Switch LS–14 in circuit 10 is also closed by the elevator in its lowered position and motor M3 is energized to rotate the rollers on the table to carry the loaded pallet out of the machine. As the load leaves the machine, the roller 736B is raised and the contacts LS–8A in circuit 10 are opened to de-energize motor M3.

It should be noted that, as the load elevator was lowered during the formation of the load, the arms on the table frame pulled the pallet stripper carriage PSC to its retracted position. When switch LS–14 in circuit 10 was closed by the elevator as it reached its lowered position, the motor windings M4–U in circuit 12 were energized through switch LS–7, which was closed when the uppermost pallet was previously removed from the pallet elevator, and contacts LS–5A which are not opened until the pallet elevator is near its uppermost, empty position. As the pallet elevator raised, the uppermost pallet contacts switch LS–7 and opens it, de-energizing M4–U and stopping the pallet in position to be stripped onto the load table.

When M4–U is de-energized, interlock M4–U1 in circuit 9 is closed and, since interlocks M5–1 and M3–1 are now closed, the load having been discharged, and since contacts LS–1B are closed due to the load table reaching its lowermost position, windings M2–U are energized to start the load elevator upwardly once more. As the load elevator rises, it permits the torsion spring associated with the pallet stripper to move into pallet-stripping contact with the uppermost pallet in the load. The previously mentioned stop latches FIG. 3C prevent the pallet from moving away from the stripper carriage. When the load elevator reaches the position indicated by reference line X in FIG. 3, switch LS–2 in circuit 11 is closed by the actuator 933 and motor M3 is energized due to the fact that contacts LS–8B were closed after the load left the machine. Interlock M3–1 in circuit 9 opens to de-energize M2–U. The rollers of the table are rotated by M3 to receive the pallet from the pallet stripper carriage and move it across the table into engagement with the raised roller 736B.

The engagement of the pallet with the roller 736B causes contacts LS–8B in circuit 11 to open to de-energize M3. When M3 is de-energized, interlock M3–1 in circuit 9 closes to energize M2–U to raise the load elevator again. When the elevator reaches its uppermost position, switch LS–1 is actuated to open contacts LS–1B in circuit 9 and de-energize M2–U.

When the last pallet has been removed from the pallet elevator, the stripper carriage PSC actuates switch LS–11 in circuit 13 to energize M4–D through contact LS–5B which was closed by the pallet elevator when it reached its uppermost position. The pallet elevator is then lowered and, when it reaches its lowered position, it opens LS–5B in circuit 13 to de-energize M4–D. Contact LS–5A in circuit 12 is closed. Also, the pallet elevator closes LS–4 to energize motor M5 which carries a new load of pallets into the machine. When the load of pallets engages switch LS–6 (circuit 14) the switch is opened and M5 is de-energized. The interlock M5–2 in circuit 12 closes and M4–U will then be energized to raise the pallet elevator, the next time the load elevator reaches its lowered position and closes switch LS–14 in circuit 10.

It should be noted that interlocks M2–D1 in circuit 17 and M2–U1 in circuit 18 energize the load elevator brake 760, releasing it when the elevator is to be lowered or raised. Also, the interlocks M4–D1 in circuit 19 and M4–U1 in circuit 20 release the pallet elevator brake 834 when the pallet elevator is lowering or raising.

To accommodate the operation of the machine at a high rate of cases per minute, a safety circuit has been provided which will stop the infeed of cases while a load is being discharged and the load table is being raised to receive a pallet and position it under the layer stripper carriage. Contact LS–12A (circuit 5) is opened when the load elevator moves to its lowered position. If the cases are being handled exceptionally fast, a new layer of cases may be released and moved onto the layer stripper before the table is in its upper position. In this case, contacts LS–10A in circuit 4 are opened and relay B is de-energized. Contact B–2 in circuit 3 opens to stop the case feed motor M6. Contact B–1 in circuit 21 also opens, de-energizing stripper brake 682 and preventing the energization of clutch 680. As a result, the new layer remains on the layer stripper until the load table reaches its uppermost position, closing contacts LS–1A (circuit 6), whereby relay B is again energized. When this safety circuit is incorporated in the machine, it is necessary to provide a fixed track at the forward end of the machine so that, when the leading roller 600B reaches the forward end of the stripping zone, it will be raised out of engagement with the chain that drives it.

Referring again to FIG. 32, it will be appreciated that the gears and sprockets should be chosen so that the various operations are carried out smoothly. In one successful installation, the drive components were so chosen that, when the motor M1 was operated at 505 r.p.m., the various shafts rotated at approximately the following speeds; shaft 907 at 232 r.p.m., shaft 908 at 183 r.p.m., shaft 911 at 183 r.p.m., shaft 631 at 152 r.p.m., shaft 673 at 152 r.p.m., shaft 642 at 38 r.p.m., shaft 202 at 174 r.p.m., shaft 171 at 65.2 r.p.m., shaft 97 at 170 r.p.m., and shaft 436 at 525 r.p.m. Also, the drive components were so chosen that the accumulator rollers 495, which had an outside diameter of 2.25", were rotated at 250 r.p.m. The stripper rollers 600 of the layer stripper carriage had an outside diameter of 1.25", their drive sleeves 610 had an outside diameter of 1.625", and they had a peripheral speed of 128 f.p.m. The lead roller 600B had an outside diameter of approximately 1.375" and was rotated at 271 r.p.m. When the layer stripper carriage was moved rearwardly to strip the layer therefrom, it moved at about 61.3 f.p.m.

The rollers 850 of the pallet stripper carriage and the drive sleeves on the rollers were identical in diameter to the carriage rollers 600 and sleeves 610 and had a peripheral speed of 147 f.p.m. The lead roller 850A had a pallet contacting surface with an outside diameter of 1.5" and was rotated at 298 r.p.m. During the pallet stripping operation the speed of the carriage was limited by the arms 814 of the load elevator to a speed of 72 f.p.m. The belts 415 of the row diverter were driven at 308 f.p.m., and the rollers 80 of the case diverter, the rollers 222 of the case turner, and the rolls 300 of the row accumulator, all of which had an outside diameter of 1.25 inches, had a peripheral speed of 187 f.p.m. While the leading roller of the pallet stripper is lifting the pallet and moving under the pallet, its counterclockwise speed is reduced, however, when the stripper passes the point where the pallet overbalances and rests flat on the stripper, the bodily movement of the stripper carriage is arrested, the speed of the roller increases, and the pallet is conveyed out of the magazine.

A brief résumé of the operation of the machine will be described with reference to FIGS. 2, 3, and 32. As each case leaves the feed conveyor FC and enters the case diverter CD on the belts 100, it engages switch LSA to energize a single revolution clutch that drives camshaft 171 through one revolution. During this revolution of the camshaft, the program chain actuates certain solenoids depending upon whether or not the case is to be turned, whether the gap-forming roller is to be raised in front of the case, or whether or not a previously formed row is to be discharged from the row accumulator RA or a layer is to be discharged from the layer accumulator LA. Also, during the revolution of the camshaft, the cam 170 lowers the belts 100 permitting the case to be deposited on the rollers 80 of the case diverter CD which then move the case sidewise onto the case turner CD. The case may proceed onto the row accumulator conveyor RA without being turned and then will be one of several cases making up a row of cases having the same orientation as they had on the case feed conveyor FC. If the case is turned 90° on the case turner it will be one of a row of cases formed on the row accumulator with this new orientation. If the program chain has actuated an appropriate solenoid, the gap-forming roller 300A will pop-up in front of the case to stop it in spaced relation to the case preceding it.

When a row has been formed, the program chain control bar associated with the first case of the next row will actuate the row diverter RD to raise the belts 415 which will carry the row onto the layer accumulator LA where it will abut the stop bar 51 or will abut a row of cases previously disposed on the layer accumulator.

When a layer of cases is formed on the layer accumulator, the program chain control rod associated with the second case in the first row of the next layer will pull the stop roller 51 down and the layer will move onto the rollers 600 of the layer stripper carriage LSC which are rotating clockwise (FIG. 3). When the leading row of cases engages the stop bar 711, the brake that is holding the carriage in its forward position will be released and the clutch will be engaged, whereby the stripper carriage will be driven rearwardly. When the entire layer has been deposited on a pallet held by the table T, the table will be lowered, the stripper carriage will be returned by its torsion spring to its forward position, and a second layer will be conveyed onto the layer stripper carriage LSC.

When the desired number of layers of cases has been formed on the table, the table will move to its lowermost position, the rollers of the table will be rotated, and the load will be conveyed out of the machine onto the discharge conveyor DC. When the load is discharged, the load elevator LE carries the table upwardly, the arms 814 on the rear of the elevator frame permitting the pallet stripper carriage to move into contact with the uppermost pallet on the pallet elevator PE.

The leading roller 860A rotates clockwise (FIG. 3), grips the edge of the pallet, lifts it upwardly, and passes thereunder as seen in FIG. 3C while the pallet restrainer 896 prevents movement of the pallet away from the stripper. As the table T reaches and stops at the position X (FIG. 3) the empty pallet is fed onto the table, and the rollers of the table are rotated clockwise to move the pallet across the table to a position abutting the roller 736B. The load elevator is actuated again to raise the pallet to case receiving position.

From the foregoing description it will be evident that the present invention provides a machine capable of efficiently forming individual cases into layers of cases and depositing the layers in predetermined formation on a pallet. The novel case turner CT, the pop-up type gap-forming mechanism, and the unique row diverter belts make possible the efficient handling of articles such as cases. Further, the unique arrangement of two stripper carriages in a single machine and their coordinated actuation to form loads on a pallet, discharge the load and position an empty pallet on the load elevator permit the machine to be more compact than any palletizer heretofore available for carrying out a complete palletizing operation.

It will be understood that modifications and variations may be made without departing from the scope of the present invention as defined by the claims appended hereto.

Having thus described my invention, what I claim as new and desire to protect by Letters Patent is:

1. In an article handling apparatus, a support structure, means for advancing a predetermined number of articles along said structure, a camshaft journalled in said structure, a plurality of cams on said shaft, a plurality of article handling mechanisms disposed in spaced relation in said structure and arranged when actutated to manipulate the articles as they are advanced, each mechanism including a cam follower associated with one of said cams and a solenoid arranged when energized to render said follower capable of reacting to the configuration of the camming surface of the associated cam to effect an article-manipulating operation, a control circuit for each solenoid, a switch in each circuit, an endless program chain having a separate carrier corresponding to each article of said predetermined number of articles, a plurality of switch-actuator mounting areas on each carrier, each area being in alignment with one of said switches and each area being arranged to alternately receive an actuator capable of actuating the switch aligned therewith or a space filler that is incapable of actuating the switch, and means for moving said program chain in timed relation with said camshaft to successively present each carrier to said switches whereby switch actuators on said carrier will engage the associated switches to energize said solenoids and render the associated cam follower capable of following the camming surface of the associated cam to effect an article-manipulating operation.

2. In an article handling apparatus, a support structure, conveying means for advancing a predetermined number of articles along said structure, a camshaft journalled in said structure, a plurality of cams on said shaft, a plurality of article-handling mechanisms disposed in spaced relation in said structure and arranged when actuated to manipulate the articles as they are advanced, a cam follower operatively connected to each mechanism and associated with one of said cams, a control mechanism connected to each cam follower and arranged when actuated to render said follower capable of reacting to the configuration of the associated cam surface to effect an article-manipulating operation, and a program unit movable in timed relation with said camshaft and having a control element associated with the control mechanism of each cam follower for actuating said mechanism incident to rotation of said camshaft, and means responsive to the passage of an article along an initial zone of said conveying mechanism for indexing said camshaft through a predetermined angular movement whereby control elements on said program unit will actuate the control mechanism of associated cam followers and permit said followers to react to the surface of the adjacent cam to effect an article-manipulating operation.

References Cited by the Examiner
UNITED STATES PATENTS

| | | | |
|---|---|---|---|
| 981,613 | 1/1911 | Carter | 193—38 |
| 1,156,721 | 10/1915 | Strunk | 198—31 |
| 1,321,303 | 11/1919 | Haldeman. | |
| 1,703,773 | 2/1929 | Lee | 193—38 |
| 1,951,178 | 3/1934 | Smithmans. | |
| 2,633,251 | 3/1953 | Bruce. | |
| 2,666,536 | 1/1954 | Smith | 214—11 |
| 2,757,780 | 8/1956 | Sousa | 198—34 |
| 2,780,340 | 2/1957 | Hynson. | |
| 2,788,156 | 4/1957 | Cruzan | 221—251 |
| 2,840,223 | 6/1958 | Schoppee | 198—34 |
| 2,851,146 | 9/1958 | Sherrill | 198—31 |
| 2,901,128 | 8/1959 | Barski. | |
| 2,946,465 | 7/1960 | Raynor. | |
| 2,977,003 | 3/1961 | Muller | 214—11 |
| 2,997,187 | 8/1961 | Burt. | |
| 3,034,684 | 5/1962 | Jackson | 221—251 |
| 3,050,199 | 8/1962 | McGrath. | |

GERALD M. FORLENZA, *Primary Examiner.*
MORRIS TEMIN, HUGO O. SCHULZ, *Examiners.*
J. JONES, *Assistant Examiner.*